United States Patent
Oike

(10) Patent No.: US 9,420,028 B2
(45) Date of Patent: Aug. 16, 2016

(54) REMOTE CONFERENCE SYSTEM AND NON-TRANSITORY COMPUTER READABLE MEDIUM STORING PROGRAM FOR REMOTE CONFERENCE

(71) Applicant: Brother Kogyo Kabushiki Kaisha, Nagoya-shi, Aichi-ken (JP)

(72) Inventor: Kenji Oike, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/581,780

(22) Filed: Dec. 23, 2014

(65) Prior Publication Data

US 2015/0189235 A1 Jul. 2, 2015

(30) Foreign Application Priority Data

Dec. 27, 2013 (JP) ................................. 2013-270726

(51) Int. Cl.
*H04N 7/14* (2006.01)
*H04L 29/06* (2006.01)
*H04N 7/15* (2006.01)

(52) U.S. Cl.
CPC .......... *H04L 65/607* (2013.01); *H04L 65/4038* (2013.01); *H04L 65/602* (2013.01); *H04L 65/604* (2013.01); *H04N 7/15* (2013.01)

(58) Field of Classification Search
CPC . G01S 5/0072; H04L 65/403; H04L 65/4038; H04L 65/4084; H04L 65/4092; H04L 65/602; H04L 65/604; H04L 65/607; H04M 1/72572; H04M 2201/40; H04M 2250/52; H04M 3/4936; H04M 3/5191; H04N 2007/145; H04N 5/272; H04N 7/14; H04N 7/141; H04N 7/142; H04N 7/144; H04N 7/147; H04N 7/148; H04N 7/15; H04N 7/152; H04N 7/155; H04N 7/157; H04N 7/23206; H04W 4/18; H04W 4/185
USPC .......... 348/14.01, 14.02, 14.03, 14.04, 14.05, 348/14.06, 14.07, 14.08, 14.09, 14.1, 14.11, 348/14.12, 14.13, 14.14, 15.15, 14.16; 379/265.03; 455/414.1, 566; 704/270
See application file for complete search history.

(56) References Cited

U.S. PATENT DOCUMENTS 5,371,536 A * 12/1994 Yamaguchi ............. G01S 3/786 348/14.1
5,568,184 A * 10/1996 Shibata .................... H04N 7/15 348/14.09

(Continued)

FOREIGN PATENT DOCUMENTS

| JP | 2007-150921 A | 6/2007 |
|---|---|---|
| JP | 2010-035248 A | 2/2010 |
| JP | 2010-157083 A | 7/2010 |

OTHER PUBLICATIONS

Dec. 23, 2014—(US) Co-pending U.S. Appl. No. 14/581,845.

(Continued)

*Primary Examiner* — Khai N Nguyen
(74) *Attorney, Agent, or Firm* — Banner & Witcoff, Ltd.

(57) ABSTRACT

A communication device obtains video data. The video data includes a plurality of inter-frame coded image data and a plurality of intra-frame coded image data. The communication device displays a portion of a video layout region on a video display region of a display of the communication device. A plurality of captured images, reproduced from video data, is laid out in the video layout region. When a specific captured image is not included in the video display region, the communication device determines update frequency information. The update frequency information sets at least a portion of the plurality of inter-frame coded image data included in specific video data, corresponding to the specific captured image, as a non-target for transmission. The communication device transmits the update frequency information via a communication unit of the communication device.

17 Claims, 14 Drawing Sheets

(56) References Cited

U.S. PATENT DOCUMENTS

| | | | |
|---|---|---|---|
| 6,078,349 A * | 6/2000 | Molloy | G06F 3/0481 348/14.07 |
| 7,479,983 B2 | 1/2009 | Fisher et al. | |
| 7,511,742 B2 | 3/2009 | Ito et al. | |
| 7,882,199 B2 | 2/2011 | Ludtke et al. | |
| 7,920,159 B2 * | 4/2011 | Ueno | H04N 7/15 348/14.08 |
| 7,999,781 B2 | 8/2011 | Inada | |
| 8,233,200 B2 | 7/2012 | Metayer et al. | |
| 8,416,280 B2 | 4/2013 | Oike | |
| 8,417,233 B2 * | 4/2013 | Woloshyn | G06F 3/0488 455/412.1 |
| 8,483,715 B2 | 7/2013 | Chen | |
| 8,531,541 B2 | 9/2013 | Terashima | |
| 8,581,956 B2 | 11/2013 | Robinson et al. | |
| 8,675,038 B2 | 3/2014 | Wessling | |
| 8,787,187 B2 | 7/2014 | Nakamura et al. | |
| 8,791,977 B2 | 7/2014 | Marvit | |
| 8,823,769 B2 * | 9/2014 | Sekine | H04N 7/15 348/14.16 |
| 8,848,022 B2 | 9/2014 | Yasoshima | |
| 9,124,765 B2 | 9/2015 | Zhang et al. | |
| 2003/0235399 A1 * | 12/2003 | Kawahara | H04N 1/00323 386/241 |
| 2004/0008249 A1 * | 1/2004 | Nelson | H04N 7/152 348/14.09 |
| 2007/0199076 A1 * | 8/2007 | Rensin | H04L 29/06027 726/27 |
| 2009/0309897 A1 * | 12/2009 | Morita | H04M 1/2535 345/629 |
| 2011/0222676 A1 * | 9/2011 | Okada | H04N 7/147 379/93.21 |
| 2012/0062688 A1 | 3/2012 | Shen et al. | |
| 2013/0010092 A1 | 1/2013 | Wang et al. | |
| 2015/0095281 A1 * | 4/2015 | Nieminen | G06F 17/30377 707/618 |
| 2015/0103885 A1 * | 4/2015 | Feng | H04N 19/107 375/240.02 |
| 2015/0156459 A1 * | 6/2015 | Sugiura | H04N 7/152 348/14.13 |
| 2015/0189235 A1 | 7/2015 | Oike | |
| 2015/0189236 A1 | 7/2015 | Oike | |

OTHER PUBLICATIONS

Oct. 23, 2015—(US)—Non-Final Office Action—U.S. Appl. No. 14/581,845.

Feb. 16, 2016—(US) Notice of Allowance—U.S. Appl. No. 14/581,845.

* cited by examiner

Fig. 3

| AREA INSIDE VIDEO LAYOUT REGION | ID INFORMATION | TOTAL VIDEO PLAY TIME [sec.] | TOTAL AUDIO PLAY TIME [sec.] |
|---|---|---|---|
| AREA A1 (1C, 1R) | 71 | 100.1 | 20.02 |
| AREA A2 (1C, 2R) | 72 | 300.1 | 100.00 |
| AREA A3 (1C, 3R) | 73 | 300.0 | 120.00 |
| AREA A4 (1C, 4R) | 74 | 200.0 | 40.02 |
| AREA A5 (1C, 5R) | 75 | 0.0 | 0.00 |

Fig. 5

| UPDATE FREQUENCY INFORMATION | COMPRESSED IMAGE | | MINIMUM I-FRAME TRANSMISSION INTERVAL [msec.] |
|---|---|---|---|
| | TARGET FOR TRANSMISSION | NON-TARGET FOR TRANSMISSION | |
| 1 | NONE | I-FRAME, P-FRAME & B-FRAME | 0 |
| 2 | I-FRAME | P-FRAME & B-FRAME | 2000 |
| 3 | I-FRAME | P-FRAME & B-FRAME | 300 |
| 4 | I-FRAME & P-FRAME | B-FRAME | 0 |
| 5 | I-FRAME, P-FRAME & B-FRAME | NONE | 0 |

Fig. 6

| ID INFORMATION (TARGET) | 71 | 72 | 73 | 74 | 75 |
|---|---|---|---|---|---|
| UPDATE FREQUENCY INFORMATION | 5 | 5 | 3 | 1 | 1 |

Fig. 13

| ID INFORMATION (SENDER) | ID INFORMATION (TARGET) | | | | | |
|---|---|---|---|---|---|---|
| | 30 | 71 | 72 | 73 | 74 | 75 |
| 30 | - | 5 | 5 | 3 | 1 | 1 |
| 71 | 3 | - | 5 | 5 | 2 | 1 |
| 72 | 2 | 5 | - | 5 | 2 | 1 |
| 73 | 5 | 5 | 5 | - | 2 | 1 |
| 74 | 5 | 5 | 2 | 3 | - | 1 |
| 75 | 1 | 2 | 3 | 5 | 4 | - |

Fig. 16

| AREA INSIDE VIDEO LAYOUT REGION | | | | ID INFORMATION | IMAGE DISPLAYED | TOTAL VIDEO PLAY TIME [sec.] | TOTAL AUDIO PLAY TIME [sec.] |
|---|---|---|---|---|---|---|---|
| X | Y | WIDTH | HEIGHT | | | | |
| 10 | 30 | 160 | 100 | 71 | NO | 100.1 | 20.02 |
| 180 | 30 | 160 | 100 | 72 | YES | 300.1 | 100.00 |
| 350 | 30 | 160 | 100 | 73 | YES | 300.0 | 120.00 |
| 520 | 30 | 160 | 100 | 74 | YES | 200.0 | 40.00 |
| 690 | 30 | 160 | 100 | 75 | NO | 0.0 | 0.00 |

REMOTE CONFERENCE SYSTEM AND NON-TRANSITORY COMPUTER READABLE MEDIUM STORING PROGRAM FOR REMOTE CONFERENCE

CROSS-REFERENCES TO RELATED APPLICATION

This application claims priority to Japanese Patent Application No. 2013-270726 filed on Dec. 27, 2013, the content of which is herein incorporated by reference in its entirety.

TECHNICAL FIELD

Aspects relate to a non-transitory storage medium that stores programs executable by a computer that controls a communication device used in a remote conference via a network, a non-transitory storage medium that stores programs for a server used in the remote conference, and a remote conference system.

BACKGROUND

There has been known a technique relating to a remote conference. For example, a known communication device is installed at each location for a television conference in a television conference system. In the television conference system, each communication device is connected to the other communication devices to perform a television conference. Each communication device includes a monitor, on which a plurality of windows is displayed. Upon receipt of moving image data from one or more other communication devices installed at other respective locations, a communication device displays moving images of the respective locations in respective windows on the monitor. In the communication device, for example, when a size of a window in which a moving image is displayed is reduced, a control command for decreasing a frame rate or resolution of moving image data is generated. In another example, when a window is dismissed, a control command for stopping transmission of moving image data is generated. Such a control command is transmitted to a communication device that sent the moving image data.

SUMMARY

A remote conference may be performed using a plurality of communication devices connected to a network. Data of video and audio in a remote conference may be communicated between the plurality of the communication devices via the server connected to the network. Each communication device may display captured images corresponding to a plurality of pieces of video data transmitted from the other communication devices. The number of captured images to be displayed in each communication device may increase with an increase in number of communication devices to be used (e.g., locations) in a remote conference. In some cases, the captured images of all the locations might not be displayed on a monitor at the same time in a communication device. In order to display one or more hidden captured images on the monitor, a user of the communication device may input, into the communication device, an instruction to move one or more captured images, through an operation for changing one or more captured images to be displayed (e.g., scrolling, swiping, and/or changing a tab). In response to the instruction, the communication device may display the one or more hidden captured images. When the communication device receives such an instruction while receipt of video data corresponding to the one or more hidden captured images has been stopped, the communication device starts receiving the corresponding video data in response to the instruction. Video data includes an intra-frame coded image data and an inter-frame coded image data. The intra-frame coded image data may be decoded without reference to information of another frame. In contrast to this, for example, an inter-frame coded image data may be decoded with reference to information of an intra-frame coded image data. Therefore, if the communication device receives an inter-frame coded image data in response to the moving instruction, the communication device might not decode video data until the communication device receives an intra-frame coded image data. Owing to this, a captured image corresponding to the video data might not be displayed until the communication device receives an intra-frame coded image data, whereby a hidden captured image might not be displayed smoothly in response to the changing operation in some cases.

Some embodiments provide for a remote conference system, and a non-transitory storage medium that stores programs to be used for a remote conference, which may enable one or more hidden captured images to be displayed smoothly while restricting increase of an amount of video data to be communicated between communication devices.

An aspect of the present disclosure is a communication device. The communication device obtains a plurality of video data. Each of the plurality of video data including a plurality of inter-frame coded image data and a plurality of intra-frame coded image data. The communication device displays a portion of a video layout region on a video display region of a display of the communication device. A plurality of captured images, from the plurality of video data, being laid out in the video layout region. When a specific captured image is not included in the video display region, the communication device determines update frequency information. The update frequency information set at least a portion of the plurality of inter-frame coded image data included in specific video data, corresponding to the specific captured image, as a non-target for transmission. The communication device transmits the update frequency information via a communication unit of the communication device.

DESCRIPTION OF THE DRAWINGS

Aspects of the disclosure are illustrated by way of example and not by limitation in the accompanying figures in which like reference characters indicate similar elements.

FIG. 3 illustrates an example status table in the illustrative embodiment according to one or more aspects of the disclosure.

FIG. 5 is an explanatory diagram for explaining an update rule in the illustrative embodiment according to one or more aspects of the disclosure.

FIG. 6 illustrates an example update frequency setting to be transmitted from a particular communication device to a FIG. 7 is a flowchart depicting an example update frequency determining processing in the illustrative embodiment according to one or more aspects of the disclosure.

FIG. 13 illustrates an example update frequency setting stored in the server in the illustrative embodiment according to one or more aspects of the disclosure.

FIG. 16 illustrates an example status table in a variation of the illustrative embodiment according to one or more aspects of the disclosure.

DETAILED DESCRIPTION

Hereinafter, an illustrative embodiment for implementing one or more aspects of the disclosure will be described with reference to the accompanying drawings. The disclosure is not limited to specific embodiments, but various aspects may be adopted in the same technical idea. For example, one or more aspects of the disclosure may be omitted or replaced with another one. The disclosure may include another aspect as well as the disclosure.

<Remote Conference System>

Figure 1:
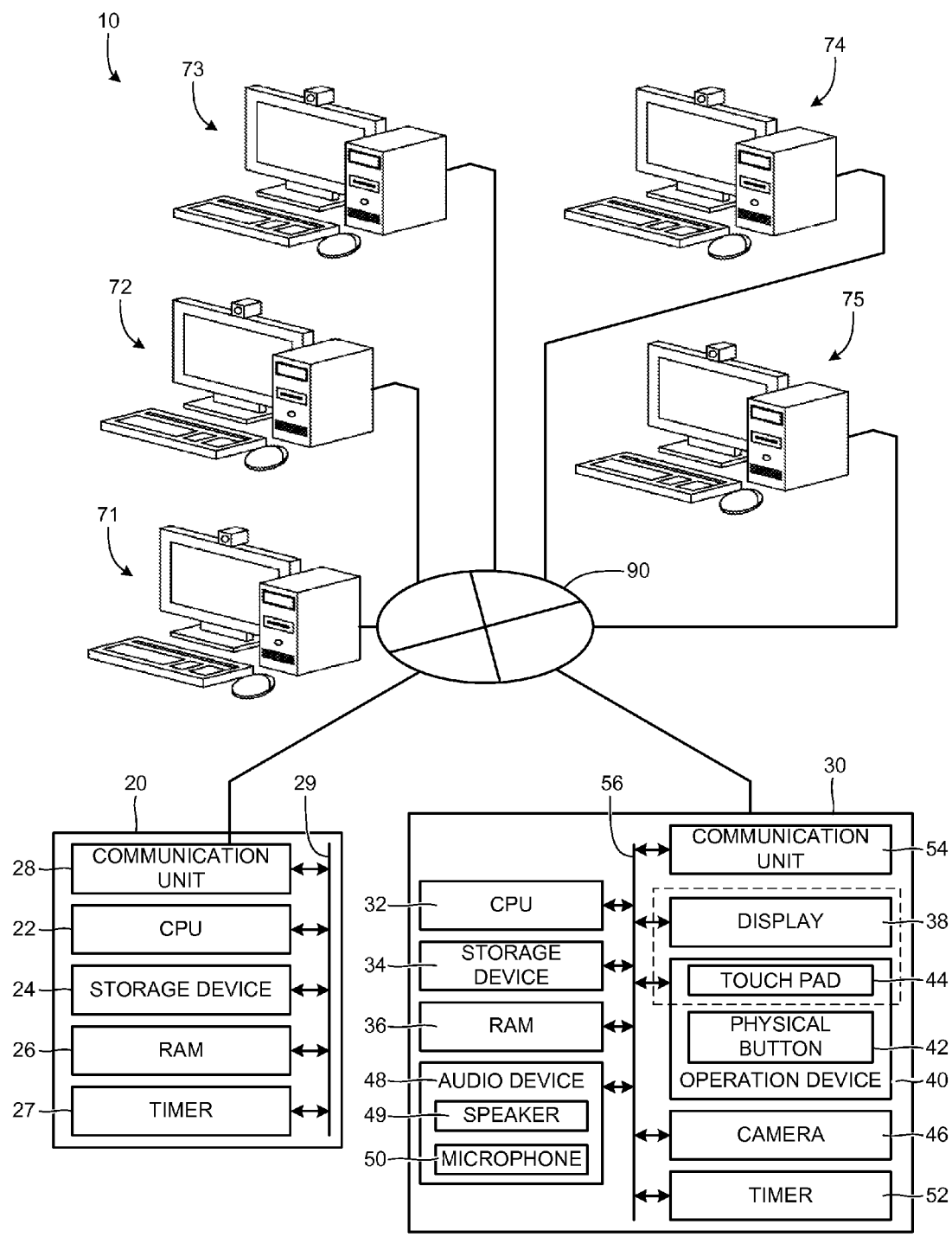
FIG. 1 illustrates an example remote conference system in an illustrative embodiment according to one or more aspects of the disclosure.

A remote conference system 10 will be described referring to FIGS. 1, 2, and 3. As depicted in FIG. 1, the remote conference system 10 includes a server 20 and a plurality of, for example, six communication devices 30, 71, 72, 73, 74, and 75. Hereinafter, a remote conference performed among parties using the communication devices 30, 71, 72, 73, 74, and 75, respectively, will be described. In other embodiments, for example, a remote conference using the remote conference system 10 may be performed among parties using five or less communication devices or using seven or more communication devices.

The server 20 and the communication devices 30, 71, 72, 73, 74, and 75 are connected to a network 90. The network 90 may be, for example, the Internet. A remote conference using the communication devices 30, 71, 72, 73, 74, and 75 may be performed via the server 20 similar to a Web conference using a known remote conference system.

The communication device 30 has a function of performing communication via the network 90. The communication device 30 may be, for example, a smartphone, a tablet terminal, or a personal computer. In this illustrative embodiment, the communication device 30 may be a mobile device, such as a smartphone or a tablet terminal. A detailed configuration of the communication device 30 will be described later. The communication devices 71, 72, 73, 74, and 75 may be a known communication device. For example, one or more of all of the communication devices 71, 72, 73, 74, and 75 may be a communication device that is the same as the communication device 30. In other embodiments, for example, the communication devices 71, 72, 73, 74, and 75 may be a personal computer. At a remote conference, the communication devices 71, 72, 73, 74, and 75 are configured to execute each processing that the communication device 30 executes (refer to FIGS. 4, 7, 8, 9, and 10). In the illustrative embodiment, a description will be made by taking the communication device 30 as an example.

In the remote conference system 10, for example, the communication device 30 transmits video data and audio data to the server 20. The video data transmitted from the communication device 30 corresponds to an image captured using the communication device 30 (hereinafter, referred to as "captured image"). The audio data transmitted from the communication device 30 corresponds to audio collected using the communication device 30. The communication device 71 also transmits video data and audio data to the server 20. The video data transmitted from the communication device 71 corresponds to an image captured using the communication device 71. The audio data transmitted from the communication device 71 corresponds to audio collected using the communication device 71. Similar to the communication device 71, each of the communication devices 72, 73, 74, and 75 transmit, to the server 20, video data corresponding to an image captured using each of the communication devices 72, 73, 74, and 75 and audio data corresponding to audio collected using each of the communication devices 72, 73, 74, and 75. The server 20 transmits the video data and audio data, which are received from the communication devices 30, 71, 72, 73, 74, and 75, to appropriate destination devices, respectively. The destination device refers to each of the communication device 30 and the communication devices 71, 72, 73, 74, and 75 other than the sender device that transmits video data and audio data. For example, the server 20 transmits video data and audio data, which are received from the communication device 30, to each of the communication devices 71, 72, 73, 74, and 75. The server 20 does not transmit the video data and the audio data, which are received from the communication device 30, to the communication device 30, which is the sender device of the video data and the audio data. In other words, in the remote conference system 10, the video data and audio data transmitted from the communication device 30 are delivered to each of the communication devices 71, 72, 73, 74, and 75 via the server 20 using a streaming method. The video data and audio data transmitted from each of the communication devices 71, 72, 73, 74, and 75 are delivered to the communication device 30 via the server 20 using the streaming method.

Video data may be moving image data compressed using a predetermined compression method. The compression method may be, for example, the H.264 video compression method. The video data according to the illustrative embodiment includes an intra-frame coded image data and an inter-frame coded image data, similar to known video data. A frame rate of video data may be, for example, 30 fps. The intra-frame coded image data includes an I-frame (intra-coded frame). The inter-frame coded image data includes a P-frame (predicted frame) and a B-frame (bi-directional predicted frame). The I-frame is an image coded without using inter-frame prediction. The P-frame is an image coded using forward prediction. The B-frame is an image coded using one of forward prediction, backward prediction, and bi-directional prediction. The I-frame, the P-frame, the B-frame are compressed images already in practical use. Therefore, a detailed description for the I-frame, the P-frame, the B-frame will be omitted. The I-frame, P-frame, and B-frame are also referred to irrespectively or correctively as "compressed image".

Each of the communication devices 30, 71, 72, 73, 74, and 75 transmits its own identification ("ID") information as sender-device's ID information, and a conference ID that identifies a remote conference in which each of the communication devices 30, 71, 72, 73, 74, and 75 participates, along with video data and audio data. The server 20 transmits the sender-device's ID information and the conference ID to each destination device along with the video data and audio data received from the sender device. The ID information and conference ID are included in, for example, each header portion of the video data and the audio data. Each ID information is information for identifying particular communication devices from one another. For example, the ID information of the communication device 30 is information for identifying the communication device 30. The ID information of each of the communication devices 71, 72, 73, 74, and 75 is information for identifying each of the communication devices 71, 72, 73, 74, and 75 from one another. In the illustrative embodiment, it is assumed that all the communication devices 30, 71, 72, 73, 74, and 75 participate in the same remote conference that is identified by a predetermined conference ID.

The communication device 30 receives video data, audio data, the ID information, and the conference ID transmitted from each of the communication devices 71, 72, 73, 74, and 75. In the communication device 30, captured images are reproduced from the respective video data received from the communication devices 71, 72, 73, 74, and 75, respectively. In other words, the communication device 30 generates captured images 381, 382, 383, 384, and 385 corresponding to the respective video data. The communication device 30 also reproduces a captured image from video data that it obtains. In other words, the communication device 30 generates a captured image corresponding to the received video data. The reproduction of a captured image may be performed, for example, by decoding a compressed image included in video data.

The captured image 381 corresponds to video data transmitted from the communication device 71. The captured image 382 corresponds to video data transmitted from the communication device 72. The captured image 383 corresponds to video data transmitted from the communication device 73. The captured image 384 corresponds to video data transmitted from the communication device 74. The captured image 385 corresponds to video data transmitted from the communication device 75.

The generated captured images 381, 382, 383, 384, and 385 and the captured image of the communication device 30 are laid out in accordance with a layout setting. A predetermined program for remote conference includes the layout setting. The predetermined program for remote conference may be, for example, a program for receiving processing of FIG. 10 (refer to step S77 in FIG. 10). The layout setting may be, for example, information in which an entire area, including a partial area where one or more captured images including the captured images 381, 382, 383, 384, and 385 are laid out, is patterned. In the communication device 30, the layout of the captured images 381, 382, 383, 384, and 385 and the captured image of the communication device 30 may be determined arbitrarily in advance. In the communication device 30, one of the options "display" and "hide" may be set to each captured image. For example, when the option of "hide" is set to the captured image of the communication device 30, the captured image of the communication device 30 is hidden. In the communication device 30, a remote conference screen, which includes contents thereon in accordance with the layout setting and the setting of one of the options of "display" and "hide", is displayed (refer to FIG. 2).

In the illustrative embodiment, according to the layout setting, for example, the option of "hide" is set to the captured image of the communication device 30 and the option of "display" is set to each of the captured images 381, 382, 383, 384, and 385. The captured images 381, 382, 383, 384, and 385 are aligned in the horizontal direction (refer to FIG. 2). The entire area in which the captured images 381, 382, 383, 384, and 385 are arranged in accordance with the layout setting is referred to as "video layout region A". The captured image 381 is arranged in an area A1 of the video layout region A. The captured image 382 is arranged in an area A2 of the video layout region A. The captured image 383 is arranged in an area A3 of the video layout region A. The captured image 384 is arranged in an area A4 of the video layout region A. The captured image 385 is arranged in an area A5 of the video layout region A. The video layout region A includes one column by five rows. The area A1 is an area in the "first column and first row" of the video layout region A. The area A2 is an area in the "first column and second row" of the video layout region A. The area A3 is an area in the "first column and third row" of the video layout region A. The area A4 is an area in the "first column and fourth row" of the video layout region A. The area A5 is an area in the "first column and fifth row" of the video layout region A. In other embodiments, for example, the video layout region A may include a plurality of columns.

The communication device 30 stores a status table therein (refer to FIG. 3). The area A1 and the ID information of the communication device 71 are stored in the status table in association with each other. The area A2 and the ID information of the communication device 72 are stored in the status table in association with each other. The area A3 and the ID information of the communication device 73 are stored in the status table in association with each other. The area A4 and the ID information of the communication device are stored in the status table in association with each other. The area A5 and the ID information of the communication device 75 are stored in the status table in association with each other. In addition to this, in the status table, a total video play time and a total audio play time are associated with each pair of one of the areas A1, A2, A3, A4 and A5 of the video layout region A and a corresponding one of the ID information. The total video play time indicates a total display duration of each of the captured images 381, 382, 383, 384, and 385 in the video display region B during a remote conference. In the communication device 30, the duration for which each of the captured images 381, 382, 383, 384, and 385 is displayed is measured and accumulated to obtain the total display duration.

The total audio play time indicates a total play duration of audio data transmitted from each of the communication devices 71, 72, 73, 74, and 75 during a remote conference. Audio data is transmitted and received in a unit of a block having a play duration of a predetermined time via the server 20 in the remote conference system 10. For example, audio data is transmitted and received in unit of a block having a play duration of 20 milliseconds (msec.). The total audio play time in each of the communication devices 71, 72, 73, 74, and 75 is obtained based on audio data received by the communication device 30 from each of the communication devices 71, 72, 73, 74, and 75. Audio data is transmitted to the server 20 from each of the communication devices 30, 71, 72, 73, 74, and 75 at predetermined regular intervals.

In FIG. 3, ID information "71" indicates the ID information of the communication device 71. ID information "72" indicates the ID information of the communication device 72. ID information "73" indicates the ID information of the communication device 73. ID information "74" indicates the ID information of the communication device 74. ID information "75" indicates the ID information of the communication device 75. The details relating to the display of the captured images 381, 382, 383, 384, and 385 that are laid out in accordance with the layout setting will be further described later.

In each of the communication devices 71, 72, 73, 74, and 75, captured images are also reproduced from respective video data received from other ones of the communication devices 30, 71, 72, 73, 74, and 75. In other words, each of the communication devices 71, 72, 73, 74, and 75 generates captured images corresponding to the respective video data. In each of the communication devices 71, 72, 73, 74, and 75, a remote conference screen, which includes contents thereon in accordance with the layout setting and the setting of one of the options of "display" and "hide", is displayed. The communication devices 71, 72, 73, 74, and 75 are also configured to reproduce a captured image from video data obtained and display the generated captured image thereon. Further, in each of the communication devices 71, 72, 73, 74, and 75, audio is reproduced from audio data received from each of the communication devices 30, 71, 72, 73, 74, and 75 other than itself and the generated audio corresponding to each audio data is outputted.

In the illustrative embodiment, similar to the setting for the communication device 30, in the setting for the communication devices 71, 72, 73, 74, and 75, the option of "hide" is set to own captured image generated by itself and the option of "display" is set to the captured images of the other communication devices. When a description is made from the viewpoint of a device that obtains predetermined data, the "sender device" or "sender" of the predetermined data in the illustrative embodiment is also referred to as "supplier device" or "supplier" of the predetermined data.

<Server>

As depicted in FIG. 1, the server 20 includes a central processing unit ("CPU") 22, a storage device 24, a random-access memory ("RAM") 26, a timer 27, and a communication unit 28. The CPU 22, the storage device 24, the RAM 26, the timer 27, and the communication unit 28 are connected to a bus 29.

The CPU 22 is configured to execute calculation processing. The storage device 24 may be implemented by a computer-readable storage medium, e.g., a hard disk. In other embodiments, for example, the storage device 24 may be implemented by a flash memory and/or a read-only memory ("ROM"). The storage device 24 stores therein various programs, for example, an operating system ("OS") and various applications. The applications stored in the storage device 24 include programs for executing various processing (refer to FIGS. 11, 12, 14 and 15). The programs for executing the above processing are preinstalled in the storage device 24.

The pre-installation of the execution programs is implemented by which a reading unit (not depicted) of the server 20 reads the programs from a computer-readable storage medium, e.g., a semiconductor memory. In other embodiments, for example, when the server 20 includes an optical drive (not depicted), such a pre-installation may be implemented by which the optical drive reads the programs from an optical medium. In still other embodiments, for example, the pre-installation may be implemented by which the server 20 receives, via the communication unit 28 of the server 20, the programs stored in a computer-readable storage medium, e.g., a hard disk, of another server, as transmission signals. The other server may be different from the server 20 connected to the network 90. The computer-readable storage medium may include a non-transitory storage medium but not include a transitory storage medium. The non-transitory storage medium may include any storage medium that is capable of storing information regardless of storage duration of information.

The RAM 26 is a storage area to be used when the CPU 22 executes various programs. The RAM 26 stores, in a predetermined storage area, predetermined data and information used in various processing during execution of the various processing.

The CPU 22 is configured to control the server 20, for example, by executing the OS and the programs for executing the processing depicted in FIGS. 11, 12, 14 and 15 stored in the storage device 24, whereby various processing are executed and various functions are implemented in the server 20.

The timer 27 has, for example, a calendar function and a clock function. The timer 27 is configured to measure elapsed time. In other embodiments, for example, the timer 27 may be implemented by a clock function of the OS. The communication unit 28 is configured to connect the server 20 to the network 90 and perform data communication via the network 90. The server 20 is configured to receive video data, audio data, and a particular conference ID from each communication device that participates in a remote conference identified by the particular conference ID. The server 20 is further configured to transmit the received video data and audio data to each destination device. For example, the communication unit 28 receives video data and audio data transmitted from each of the communication devices 30, 71, 72, 73, 74, and 75 and transmits the received video data and audio data to each destination device. In other words, the video data and audio data transmitted from each of the communication devices 30, 71, 72, 73, 74, and 75 are transferred to each destination device via the communication unit 28. The server 20 is hardwired to the network 90 via the communication unit 28. In other embodiments, for example, the server 20 may be wirelessly connected to the network 90 via the communication unit 28.

The server 20 is different from a known server in a point that the storage device 24 of the server 20 stores the programs for executing the processing depicted in FIGS. 11, 12, 14 and 15. The server 20 may be an information processing device having a communication function that is the same as the known server in terms of hardware configuration. In other embodiments, for example, the server 20 may have a configuration that is the same as the known server.

<Communication Device>

As depicted in FIG. 1, the communication device 30 includes a CPU 32, a storage device 34, a RAM 36, a display 38, an operation device 40, a camera 46, an audio device 48, a timer 52, and a communication unit 54. The CPU 32, the storage device 34, the RAM 36, the display 38, the operation device 40, the camera 46, the audio device 48, the timer 52, and the communication unit 54 are connected to a bus 56.

The CPU 32 executes calculation processing. The storage device 34 may be implemented by a computer-readable storage medium, e.g., a flash memory. In other embodiments, for example, the storage device 34 may be implemented by a hard disk and/or a ROM. The storage device 34 stores therein various programs, for example, an OS and various applications. The applications stored in the storage device 34 include programs for executing various processing (refer to FIGS. 4 and 7, 8, 9, and 10). The programs for executing the above processing may be preinstalled in the storage device 34. In other embodiments, for example, the programs may be transmitted to the communication device 30 from the server 20 via the network 90 as transmission signals when the communication device 30 accesses the server 20 for participating in a remote conference. In this case, the programs are installed in the storage device 34 or the RAM 36 of the communication device 30 upon participation of the remote conference.

The pre-installation of the execution programs is implemented by which a reading unit (not depicted) of the communication device 30 reads the programs from a computer-readable storage medium, e.g., a semiconductor memory. In other embodiments, for example, when the communication device 30 includes an optical drive (not depicted), such a pre-installation may be implemented by which the optical drive reads the programs from an optical medium. In still other embodiments, for example, the pre-installation may be implemented by which the communication device 30 receives, via the communication unit 54 of the communication device 30, the programs stored in a computer-readable storage medium, e.g., a hard disk, of another server, as transmission signals. The other server may be different from the server 20 connected to the network 90. The computer-readable storage medium may include a non-transitory storage medium but not include a transitory storage medium. The non-transitory storage medium may include any storage medium that is capable of storing information regardless of storage duration of information.

The RAM 36 is a storage area to be used when the CPU 32 executes various programs. The RAM 36 stores, in a predetermined storage area, predetermined data and information used in various processing during execution of the various processing. The RAM 36 also stores the status table (refer to FIG. 3) therein.

The CPU 32 is configured to control the communication device 30, for example, by executing the OS and the programs for executing the processing depicted in FIGS. 4 and 7, 8, 9, and 10 stored in the storage device 34, whereby various processing are executed and various functions are implemented in the communication device 30.

The display 38 is configured to display various information thereon. For example, the display 38 displays a remote conference screen including the captured images 381, 382, 383, 384, and 385 (refer to FIG. 2). The operation device 40 is configured to receive an input, e.g., various instructions with respect to the communication device 30. The operation device 40 includes, for example, a physical button 42 and a touch pad 44. The touch pad 44 may be, for example, a capacitive pointing device that is configured to output a signal indicating a position of a coordinate corresponding to a position where a finger of a user touches. In other embodiments, for example, the touch pad 44 may be a resistive pointing device or an ultrasonic pointing device. The display 38 and the touch pad 44 (enclosed with a dashed line in FIG. 1) constitute a touch panel.

A user of the communication device 30 performs operations, e.g., scrolling, swiping, flicking, tapping, dragging, pinch-in and/or pinch-out, on the touch pad 44. For example, the user of the communication device 30 moves a finger touching the touch pad 44 in a predetermined direction, to perform such operations. In response to the user's operations, predetermined signals are outputted from the touch pad 44. Operation information (e.g., types of operations and movement distance) corresponding to each operation is generated based on the predetermined signals. Processing to generate the operation information is employed in known smartphones or known tablet terminals as Application Programming Interface ("API") and also employed in the communication device 30. In other embodiments, for example, the operation device 40 may further include a keyboard and a mouse. When the communication device 30 is a personal computer, the operation device 40 includes a keyboard and a mouse.

The display of the captured images 381, 382, 383, 384, and 385 on the display 38 will be described referring to FIG. 2. The display 38 includes a display area. The video layout region A is an imaginary area that is defined beyond the display area of the display 38. The video display region B is a display area for remote conference that is defined within the display area of the display 38. In a case where an entire portion of the display area of the display 38 is defined as the display area for remote conference, the video display region B coincides with the display area of the display 38. In the illustrative embodiment, it is assumed that the entire portion of the display area of the display 38 is defined as the display area for remote conference. In FIG. 2, a "halftone area" of the display 38 indicates the display area of the display 38. The captured images 381, 382, 383, 384, and 385 are laid out in the video layout region A. A width WA of the video layout region A in the horizontal direction is greater than a width WB of the video display region B. A portion of the video layout region A is displayed in the video display region B. In other words, one or more, but not all, of the captured images 381, 382, 383, 384, and 385 are displayed in the video display region B at one time. In an example depicted in FIG. 2, particular two of the captured images 381, 382, 383, 384, and 385 are displayed in the video display region B at one time.

For example, in order to change the display contents on the display area of the display 38 from the captured images 381 and 382 (refer to an upper drawing in FIG. 2) to the captured images 384 and 385 (refer to a lower drawing in FIG. 2), a user of the communication device 30 performs a swiping operation to move a finger touching the touch pad 44 from the right to the left. In response to this, the video layout region A moves relative to the video display region B in the horizontal direction and thus the captured images 384 and 385 are displayed. In the communication device 30, with reference to the horizontal direction, particular areas of the video layout region A displayed in the video display region B are identified. For example, in a case of the upper drawing in FIG. 2, the areas A1 and A2 displayed in the video display region B are identified and information indicating the areas A1 and A2 is stored in the RAM 36. In a case of the lower drawing in FIG. 2, the areas A4 and A5 displayed in the video display region B are identified and information indicating the areas A4 and A5 is stored in the RAM 36.

The camera 46 is configured to capture an external image that presents in a predetermined direction with respect to the communication device 30 (e.g., in front of the communication device 30). For example, when there is a user of the communication device 30 in front of the communication device 30, the camera 46 captures an external image including the user. The audio device 48 includes a speaker 49 and a microphone 50. The speaker 49 is configured to output audio. The microphone 50 is configured to collect external audio. For example, the microphone 50 collects voice outputted by the user of the communication device 30. The audio device 48 is configured to output audio corresponding to audio data from the speaker 49. The audio device 48 is configured to generate waveform data through analog-to-digital conversion of audio collected by the microphone 50 using a predetermined sampling frequency (e.g., 11.025 kHz or 44.1 kHz). The communication device 30 is configured to start capturing an external image using the camera 46 and collecting external audio using the microphone 50 upon start of a remote conference. In the communication device 30, video data corresponding to a captured image and audio data corresponding to the generated waveform data are generated.

The timer 52 has, for example, a calendar function and a clock function. The timer 52 is configured to measure elapsed time. In other embodiments, for example, the timer 52 may be implemented by a clock function of the OS. The communication unit 54 is configured to connect the communication device 30 to the network 90 and perform data communication via the network 90. For example, the communication unit 54 of the communication device 30 transmits video data and audio data, which are generated during a remote conference, to the server 20, along with the ID information of the communication device 30 and the conference ID identifying the remote conference in which the communication device 30 participates. Then, the server 20 further transmits the received video data, audio data, and ID information of the communication device 30 to each of the communication devices 71, 72, 73, 74, and 75 that participate in the remote conference identified by the same conference ID. The communication unit 54 of the communication unit 30 receives video data, audio data, and the sender-device's ID information transmitted from each of the communication devices 71, 72, 73, 74, and 75 via the server 20. The communication device 30 is wired or wirelessly connected to the network 90 communication unit 54. For example, when the communication device 30 is a mobile device, the communication device 30 is wirelessly connected to the network 90 via the communication unit 54. The communication unit 54 is a communication module for performing wireless communication in compliance with a known communication standard, for example, a Wi-Fi standard, a 4G standard, or a 3G standard.

The communication device 30 is different from a known mobile device in a point that the storage device 34 of the communication device 30 stores the programs for executing the processing depicted in FIGS. 4, 7, 8, 9, and 10. The communication device 30 may be a communication device that is the same as a known mobile device in terms of hardware configuration.

<Processing Executed in Communication Device>

The various processing executed in the communication device 30 during a remote conference will be described. In the remote conference system 10, for example, the server 20 sends an electronic mail ("e-mail") to e-mail addresses corresponding to the communication devices 30, 71, 72, 73, 74, and 75 before a predetermined time and date of a particular remote conference. Each e-mail includes a Uniform Resource Locator ("URL") of the particular remote conference to be held among the communication devices 30, 71, 72, 73, 74, and 75. The URL is unique to each virtual conference room of a remote conference. In other words, the URL includes a conference ID of a remote conference. The conference ID may be included as, for example, a query parameter of a URL.

The user of the communication device 30 performs an appropriate operation on the communication device 30 on or after the predetermined time and date of the particular remote conference. For example, in the communication device 30, the CPU 32 accesses the server 20 via the communication unit 54 based on the URL including the conference ID of the particular remote conference, and executes processing for establishing a session for the particular remote conference with the server 20. In other embodiments, for example, the CPU 32 may allow the communication unit 54 to transmit a login request including a predetermined user ID and a password to the server 20. In this case, when a login is successful, the CPU 32 may transmit the conference ID from the communication unit 54 to the server 20 to establish a session for the particular remote conference with the server 20. Processing described below are executed while the session for the particular remote conference is established between the communication device 30 and the server 20 (e.g., while the communication device 30 is connected with a particular remote conference room for the particular remote conference).

The CPU 32 allows the timer 52 to start measuring time upon establishment of a connection of the communication device 30 to the particular remote conference room. The CPU 32 is configured to store, in the RAM 36, elapsed time from the start of measurement. In other embodiments, for example, the timer 52 may be configured to start measuring time upon establishment of connections of all the communication devices 30, 71, 72, 73, 74, and 75, which are scheduled to participate in the same remote conference identified by the same conference ID, to the particular remote conference room. Upon establishment of connections of all the communication devices 30, 71, 72, 73, 74, and 75, which are scheduled to participate in the same remote conference, to the particular remote conference room, the server 20 notifies each of the communication devices 30, 71, 72, 73, 74, and 75 that all the communication devices 30, 71, 72, 73, 74, and 75 have connected to the particular remote conference room.

<Update Frequency Transmitting Processing>

Update frequency transmitting processing will be described referring to FIG. 4. The update frequency transmitting processing is repeatedly executed at regular intervals until the communication device 30 is disconnected from the particular conference room after establishing the connection thereto. The update frequency transmitting processing is executed, at every predetermined interval, e.g., 100 msec. Subsequent to starting the update frequency transmitting processing, the CPU 32 specifies a positional relationship between the video layout region A and the video display region B (e.g., step S11). For example, the CPU 32 identifies particular areas of the video layout region A positioned within the video display region B and particular areas of the video layout region A positioned outside the video display region B. In the case of the upper drawing in FIG. 2, the CPU 32 identifies the areas A1 and A2 as the particular areas of the video layout region A positioned within the video display region B and the areas A3, A4, and A5 as the particular areas of the video layout region A positioned out of the video display region B.

Subsequently, the CPU 32 updates each total video play time associated with a corresponding one of the particular areas of the video layout region A positioned within the video display region B, in the status table stored in the RAM 36 (e.g., step S13). For example, it is assumed that the areas A1 and A2 are identified as the particular areas of the video layout region A positioned within the video display region B (refer to the upper drawing in FIG. 2). In this case, the CPU 32 updates both the total video play time associated with the area A1 and the total video play time associated with the area A2 in the status table. As described above, the update frequency transmitting processing is repeatedly executed at every predetermined interval. Therefore, the CPU 32 adds a predetermined amount of time (e.g., 100 msec.), which is the predetermined interval, to each total video play time associated with a corresponding one of the areas A1 and A2 in the status table. The predetermined interval may be the time elapsed between a timing of the last execution of step S13 and a timing of this-time execution of step S13.

Subsequently, the CPU 32 determines update frequency information (e.g., step S15). The update frequency information is determined for each of the communication devices 71, 72, 73, 74, and 75 that transmit video data. The determined update frequency information is stored with the ID information of each of the communication devices 71, 72, 73, 74, and 75. The update frequency information indicates which one or more of the compressed images of various types included in video data are determined as a non-target for transmission. For example, the update frequency information is defined as described in FIG. 5.

An update rule will be described referring to FIG. 5. In the illustrative embodiment, for example, the update rule defines update frequency levels "5", "4", "3", "2", and "1" for the update frequency information. The update frequency level "5" is the highest level for the update frequency information. Subsequent to the update frequency level "5", the level becomes lower in the order of the update frequency levels "4", "3", and "2". The update frequency level "1" is the lowest level for the update frequency information.

At the update frequency level "5", for example, an I-frame, a P-frame, and a B-frame are all determined as a target for transmission. None of the I-frame, the P-frame, and the B-frame is determined as a non-target for transmission. Therefore, for video data corresponding to the update frequency level "5", I-frames, P-frames, and B-frames are all transmitted to the communication device 30 via the server 20. Thus, this rule enables a captured image to be updated in the communication device 30 based on all of the I-frames, the P-frames, and the B-frames. A minimum I-frame transmission interval is defined as 0 msec. The minimum I-frame transmission interval indicates the shortest interval at which the server 20 transmits an I-frame which is a target for transmission.

At the update frequency level "4", for example, an I-frame and a P-frame are determined as a target for transmission and a B-frame is determined as a non-target for transmission. Therefore, for video data corresponding to the update frequency level "4", I-frames and P-frames are transmitted to the communication device 30 via the server 20, and B-frames are not transmitted to the communication device 30. Thus, this rule enables a captured image to be updated in the communication device 30 based on the I-frames and the P-frames. The minimum I-frame transmission interval is defined as 0 msec.

At the update frequency level "3", for example, an I-frame is determined as a target for transmission and a P-frame and a B-frame are determined as a non-target for transmission. The minimum I-frame transmission interval is defined as 300 msec. Therefore, for video data corresponding to the update frequency level "3", I-frames are transmitted to the communication device 30 via the server 20 at intervals of 300 msec. or longer, and P-frames and B-frames are not transmitted to the communication device 30. Thus, this rule enables a captured image to be updated in the communication device 30 based on the I-frames transmitted from the server 20 at intervals of 300 msec. or longer.

At the update frequency level "2", for example, an I-frame is determined as a target for transmission and a P-frame and a B-frame are determined as a non-target for transmission. The minimum I-frame transmission interval is defined as 2000 msec. Therefore, for video data corresponding to the update frequency level "2", I-frames are transmitted to the communication device 30 via the server 20 at intervals of 2000 msec. or longer, and P-frames and B-frames are not transmitted to the communication device 30. This rule enables a captured image to be updated in the communication device 30 based on I-frames transmitted from the server 20 at intervals of 2000 msec. or longer.

At the update frequency level "1", for example, an I-frame, a P-frame, and a B-frame are all determined as a non-target for transmission. In this case, transmission of video data corresponding to the update frequency level "1" to the communication device 30 via the server 20 is stopped. The illustrative embodiment will be described below using example cases according to the update frequency levels "5", "4", "3", "2", and "1" depicted in FIG. 5.

Subsequent to determining update frequency information for each of the communication devices 71, 72, 73, 74, and 75 in step S15, the CPU 32 controls transmission of the update frequency setting and own ID information (e.g., step S17). More specifically, in step S17, the CPU 32 outputs, to the communication unit 54, an instruction to transmit the update frequency setting and the own ID information to the server 20. Thus, the update frequency setting and the ID information of the communication device 30 are transmitted to the server 20 from the communication unit 54. The update frequency setting, which is transmitted to the server 20, includes the update frequency information determined for each of the communication devices 71, 72, 73, 74, and 75 (refer to FIG. 6). Each update frequency information is associated with a corresponding one of the ID information of the communication devices 71, 72, 73, 74, and 75 (refer to FIG. 6). The CPU 32 generates the update frequency setting based on the update frequency information that is determined as described below and stored in the RAM 36 with being associated with the ID information at the time of controlling the transmission in step S17. The ID information of the communication device 30 that is a sender may be included in, for example, a header portion of the update frequency setting. Subsequent to step S17, the CPU 32 ends the update frequency transmitting processing.

<Update Frequency Determining Processing>

Update frequency determining processing, which is executed at the time of determining the update frequency information in step S15 in the update frequency transmitting processing depicted in FIG. 4, will be described referring to FIG. 7. As described above, the update frequency determining processing is executed for each of the communication devices 71, 72, 73, 74, and 75. In the illustrative embodiment, there are five communication devices 71, 72, 73, 74, and 75 besides the communication device 30. Therefore, in the illustrative embodiment, the update frequency determining processing is successively executed five times for determining the update frequency information in step S15. The CPU 32 determines the update frequency information determined through the update frequency determining processing executed for one of the communication devices 71, 72, 73, 74, and 75 (refer to step S23, S25, S29, S33 or S37 described below), as the update frequency information of a target communication device.

Figure 4:
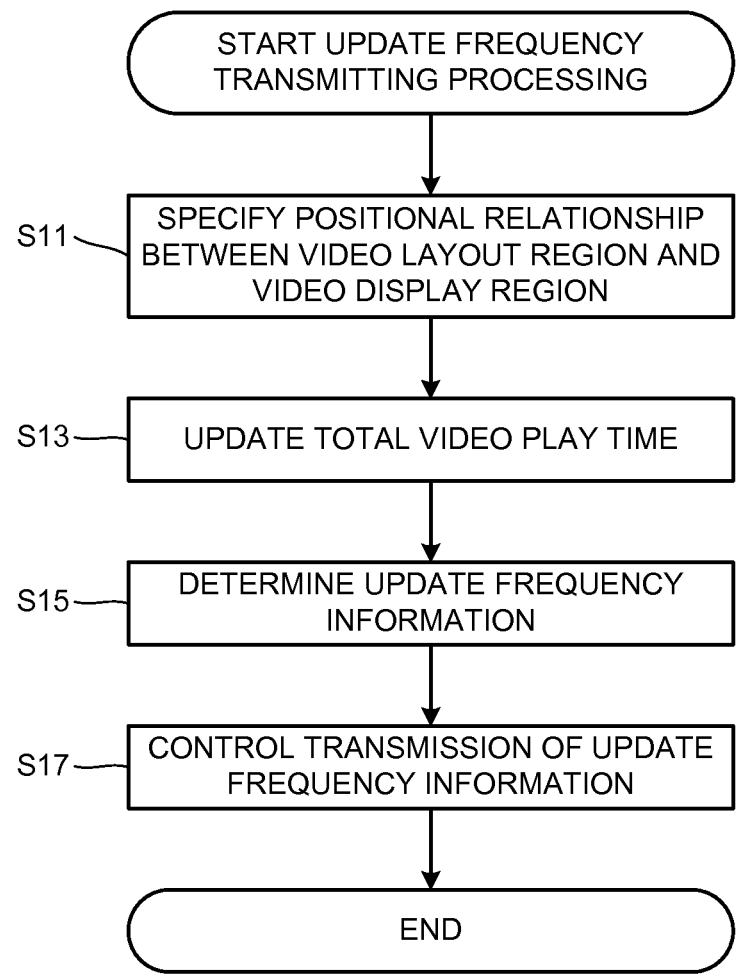
FIG. 4 is a flowchart depicting an example update frequency transmitting processing in the illustrative embodiment according to one or more aspects of the disclosure.

The CPU 32 judges whether the ID information of the target communication device targeted for the update frequency determining processing is associated with the one of the areas identified as the particular areas of the video layout region A positioned within the video display region B in step S11 of FIG. 4 (e.g., step S21). A description will be further made referring to the upper drawing of FIG. 2, and FIG. 3. In this case, in step S11 of FIG. 4, the areas A1 and A2 are identified. Therefore, when the update frequency determining processing is executed for one of the communication device 71 identified by the ID information associated with the area A1 and the communication device 72 identified by the ID information associated with the area A2 among the communication devices 71, 72, 73, 74, and 75, the CPU 32 makes a positive judgment in step S21 (e.g., YES in step S21). When the update frequency determining processing is executed for one of the communication devices 73, 74, and 75 identified by the ID information associated with the areas A3, A4, and A5 among the communication devices 71, 72, 73, 74, and 75, the CPU 32 makes a negative judgment in step S21 (e.g., NO in step S21). Hereinafter, a communication device that is targeted for the update frequency determining processing among the communication devices 71, 72, 73, 74, and 75 is referred to as "communication device targeted for processing".

When the CPU 32 makes a positive judgment in step S21 (e.g., YES in step S21), the CPU 32 designates update frequency information as update frequency level "5" (e.g., step S23). That is, when video data transmitted from the communication device targeted for processing is displayed, the update frequency information is designated as update frequency level "5". The designated update frequency level "5" is stored in the RAM 36 with being associated with the ID information of the communication device targeted for processing. When the CPU 32 makes a negative judgment in step S21 (e.g., NO in step S21), the CPU 32 designates update frequency information as update frequency level "1" (e.g., step S25). The designated update frequency level "1" is stored in the RAM 36 with being associated with the ID information of the communication device targeted for processing.

Subsequent to step S25, the CPU 32 judges whether the particular area of the video layout region A associated with the ID information of the communication device targeted for processing is positioned within an area corresponding to a reference distance WC with reference to a reference edge in a direction opposite to a moving direction (e.g., step S27). In the example depicted in the upper drawing of FIG. 2, when the communication device targeted for processing is the communication device 73, the particular area of the video layout region A associated with the ID information of the communication device targeted for processing is the area A3. When the communication device targeted for processing is the communication device 74, the particular area of the video layout region A associated with the ID information of the communication device targeted for processing is the area A4. When the communication device targeted for processing is the communication device 75, the particular area of the video layout region A associated with the ID information of the communication device targeted for processing is the area A5 (refer to FIG. 3).

Figure 2:
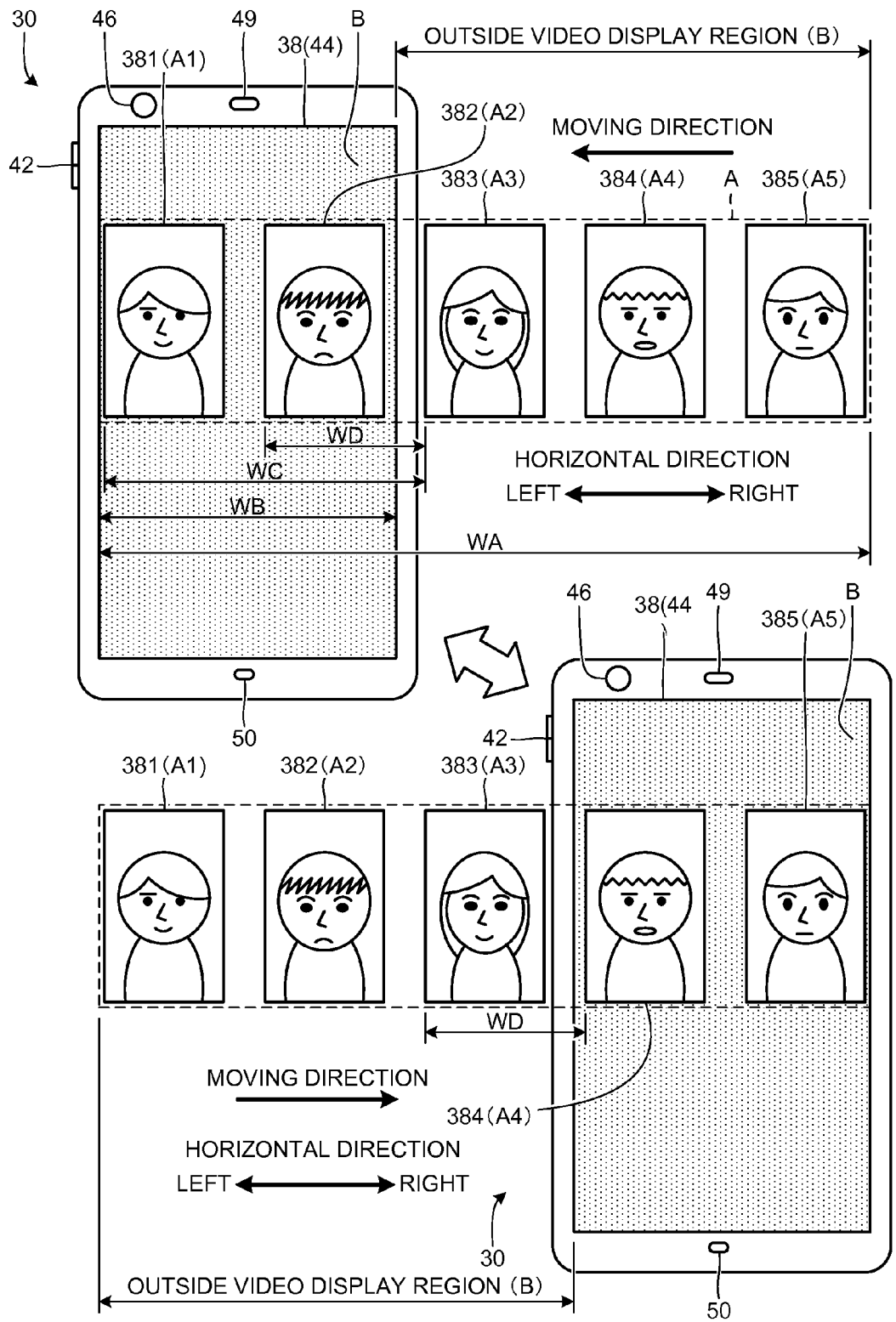
FIG. 2 illustrates a relationship between a video layout region in which one or more captured images are laid out and a video display region of a display in the illustrative embodiment according to one or more aspects of the disclosure.

In FIG. 2, the moving direction of the captured images in response to a swiping operation for displaying one or more hidden captured images is the horizontal direction. In step S27, a reference direction may be the horizontal direction. The reference edge may be a trailing edge of both edges of the video display region B in the horizontal movement. For example, in the example depicted in the upper drawing of FIG. 2, the right edge of the video display region B in the horizontal direction may be the reference edge. In the example depicted in the lower drawing of FIG. 2, the left edge of the video display region B in the horizontal direction may be the reference edge. The reference distance WC is a distance appropriate for a distance WD. The distance WD is a distance between edges on the same side (e.g., the right edges or the left edges) of adjacent two of the captured images in the horizontal direction. In the illustrative embodiment, particular two of a plurality of captured images are displayed in the video display region B at the same time (refer to FIG. 2). Therefore, the reference distance WC is twice as long as the distance WD. In other embodiments, for example, the reference distance WC may be the same as the distance WD or three times or more as long as the distance WD.

When the particular area of the video layout region A associated with the ID information of the communication device targeted for processing is positioned within the area corresponding to the reference distance WC with reference to the reference edge (e.g., YES in step S27), the CPU 32 raises, by one level, the update frequency level designated for the update frequency information in step S25 and is stored in the RAM 36 (e.g., step S29). Thus, the update frequency information stored in the RAM 36 is designated as update frequency level "2". When the particular area of the video layout region A associated with the ID information of the communication device targeted for processing is not positioned within the area corresponding to the reference distance WC with reference to the reference edge (e.g., NO in step S27), or subsequent to step S29, the CPU 32 judges whether a ratio of the total video play time associated with the ID information of the communication device targeted for processing to the duration of the ongoing remote conference is greater than or equal to a first reference value (e.g., step S31). In step S31, the CPU 32 accesses the status table stored in the RAM 36 to judge the total video play time associated with the ID information. The CPU 32 also judges an elapsed time, which is continuously measured by the timer 52 from the start of the particular remote conference upon the establishment of the connection of the communication device 30 to the particular remote conference room, as the duration of the ongoing remote conference. Subsequently, the CPU 32 judges whether a value obtained by dividing the total video play time by the duration of the ongoing remote conference is greater than or equal to the first reference value. For example, the first reference value may be 0.5 (50%). The first reference value is stored in the storage device 34 with being associated with the programs for executing the update frequency determining processing.

When the ratio of the total video play time associated with the ID information of the communication device targeted for processing to the duration of the ongoing remote conference is greater than or equal to the first reference value (e.g., YES in step S31), the CPU 32 raises, by one level, the update frequency level designated for the update frequency information stored in the RAM 36 (e.g., step S33). When step S29 has already been executed, the update frequency information stored in the RAM 36 is designated as the update frequency level "3". When step S29 has not yet been executed, the update frequency information stored in the RAM 36 is designated as the update frequency level "2".

When the ratio of the total video play time associated with the ID information of the communication device targeted for processing to the duration of the ongoing remote conference is smaller than the first reference value (e.g., step S31: No), or subsequent to step S33, the CPU 32 judges whether a ratio of the total audio play time associated with the ID information of the communication device targeted for processing to the duration of the ongoing remote conference is greater than or equal to a second reference value (e.g., step S35). In step S35, the CPU 32 accesses the status table stored in the RAM 36 to judges the total audio play time associated with the ID information. The CPU 32 also judges an elapsed time, which is continuously measured by the timer 52 from the start of the particular remote conference upon the establishment of the connection of the communication device 30 to the particular remote conference, as the duration of the ongoing remote conference. The CPU 32 judges whether a value obtained by dividing the total audio play time by the duration of the ongoing remote conference is greater than or equal to the second reference value. For example, the second reference value may be 0.2 (20%). The second reference value is stored in the storage device 34 with being associated with the programs for executing the update frequency determining processing.

When the ratio of the total audio play time associated with the ID information of the communication device targeted for processing to the duration of the ongoing remote conference is greater than or equal to the second reference value (e.g., YES in step S35), the CPU 32 raises, by one level, the update frequency level designated for the update frequency information stored in the RAM 36 (e.g., step S37). When both steps S29 and S33 have already been executed, the update frequency information stored in the RAM 36 is designated as the update frequency level "4". When one of steps S29 and S33 has already been executed, the update frequency information stored in the RAM 36 is designated as the update frequency level "3".

When the ratio of the total audio play time associated with the ID information of the communication device targeted for processing to the duration of the ongoing remote conference is smaller than the second reference value (e.g., NO in step S35), or subsequent to one of steps S23 and S37, the CPU 32 ends the update frequency determining processing. When there is one or more communication devices that are not determined as a device targeted for processing, the CPU 32 executes the update frequency determining processing again. When the update frequency determining processing has been executed for all of the communication devices 71, 72, 73, 74, and 75, the routine returns to step S17 of FIG. 4.

<Video Data Transmitting Processing>

Figure 8:
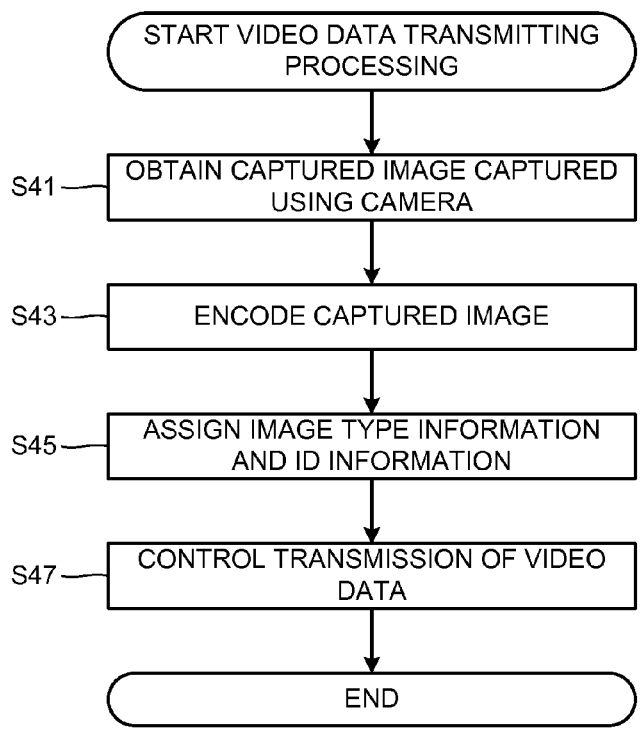
FIG. 8 is a flowchart depicting an example video data transmitting processing in the illustrative embodiment according to one or more aspects of the disclosure.

Video data transmitting processing will be described referring to FIG. 8. The video data transmitting processing is repeatedly executed at regular intervals until the communication device 30 is disconnected from the particular conference room after establishing the connection thereto. The video data transmitting processing is repeatedly executed at intervals corresponding to the frame rate of video data. For example, when the frame rate is 30 fps, the video data transmitting processing is executed at intervals of 1/30 sec. Subsequent to starting the video data transmitting processing, the CPU 32 obtains a captured image captured using the camera 46 (e.g., step S41). Subsequently, the CPU 32 generates a compressed image by encoding the captured image using a predetermined compression method, e.g., the H.264 video compression method (e.g., step S43).

The CPU 32 assigns image type information and the ID information of the communication device 30 to video data including the generated compressed image (e.g., step S45). The image type information indicates a type of the generated compressed image. For example, when the generated compressed image is an I-frame, the video data is assigned with the image type information indicating I-frame. When the generated compressed image is a P-frame, the video data is assigned with the image type information indicating P-frame. When the generated compressed image is a B-frame, the video data is assigned with the image type information indicating B-frame.

The CPU 32 controls transmission of the video data including the compressed image. The video data is assigned with the ID information of the communication device 30 and the image type information (e.g., step S47). In step S47, the CPU 32 outputs, to the communication unit 54, an instruction to transmit the video data. Thus, the video data is transmitted from the communication unit 54 to the server 20. Subsequent to step S47, the CPU 32 ends the video data transmitting processing.

<Audio Data Transmitting Processing>

Audio Data transmitting processing will be described referring to FIG. 9. The audio data transmitting processing is repeatedly executed at regular intervals until the communication device 30 is disconnected from the particular conference room after establishing the connection thereto. The audio data transmitting processing is repeatedly executed, for example, at predetermined encoding intervals (e.g., at intervals of 20 msec.). The play duration of 20 msec. of audio data corresponds to the encoding intervals of 20 msec. Subsequent to starting the audio data transmitting processing, the CPU 32 obtains audio collected using the microphone 50 (e.g., step S51). The audio obtained by the CPU 32 in step S51 includes waveform data generated through the analog-to-digital conversion of audio collected by the microphone 50 using the predetermined sampling frequency (e.g., 11.025 kHz or 44.1 kHz). The CPU 32 determines volume (dB) of the collected audio and judges whether the value representing the determined volume of the collected audio is greater than a threshold value (e.g., step S53). For example, the volume may be determined by determination of a level of the waveform of the audio obtained in step S51. The audio collected in step S51 includes a plurality of sampling points. Therefore, for example, an average level of a plurality of sampling points included in a predetermined time period may be determined as volume of audio. In other embodiments, for example, a maximum level of a plurality of sampling points included in the predetermined time period may be determined as volume of audio. The threshold value, which is the reference to be used in step S53, is predetermined in consideration given to volume of user's voice such that the CPU 32 judges that the user of the communication device 30 outputs voice in a remote conference. The threshold value is stored in the storage device 34 with being associated with the program for executing audio data transmitting processing. In other embodiments, for example, the threshold value may be changed in response to degree of background noises.

When the value representing the determined volume of audio is greater than the threshold value (e.g., YES in step S53), the CPU 32 generates compressed audio data by encoding the obtained audio using a predetermined compression method, e.g., MPEG-4 AAC or G.711 (e.g., step S55). The audio data may be a packet that includes, for example, encoded data corresponding waveform data having a play duration of 20 msec. The CPU 32 assigns the ID information of the communication device 30 to the generated audio data (e.g., step S57). Subsequently, the CPU 32 controls transmission of the audio data assigned with the ID information (e.g., step S59). In step S59, the CPU 32 outputs, to the communication unit 54, an instruction to transmit the audio data. Thus, the audio data is transmitted from the communication unit 54 to the server 20. When the value representing the determined volume of audio is smaller than or equal to the threshold value (e.g., NO in step S53), or subsequent to step S59, the CPU 32 ends the audio data transmitting processing.

<Receiving Processing>

Figure 10:
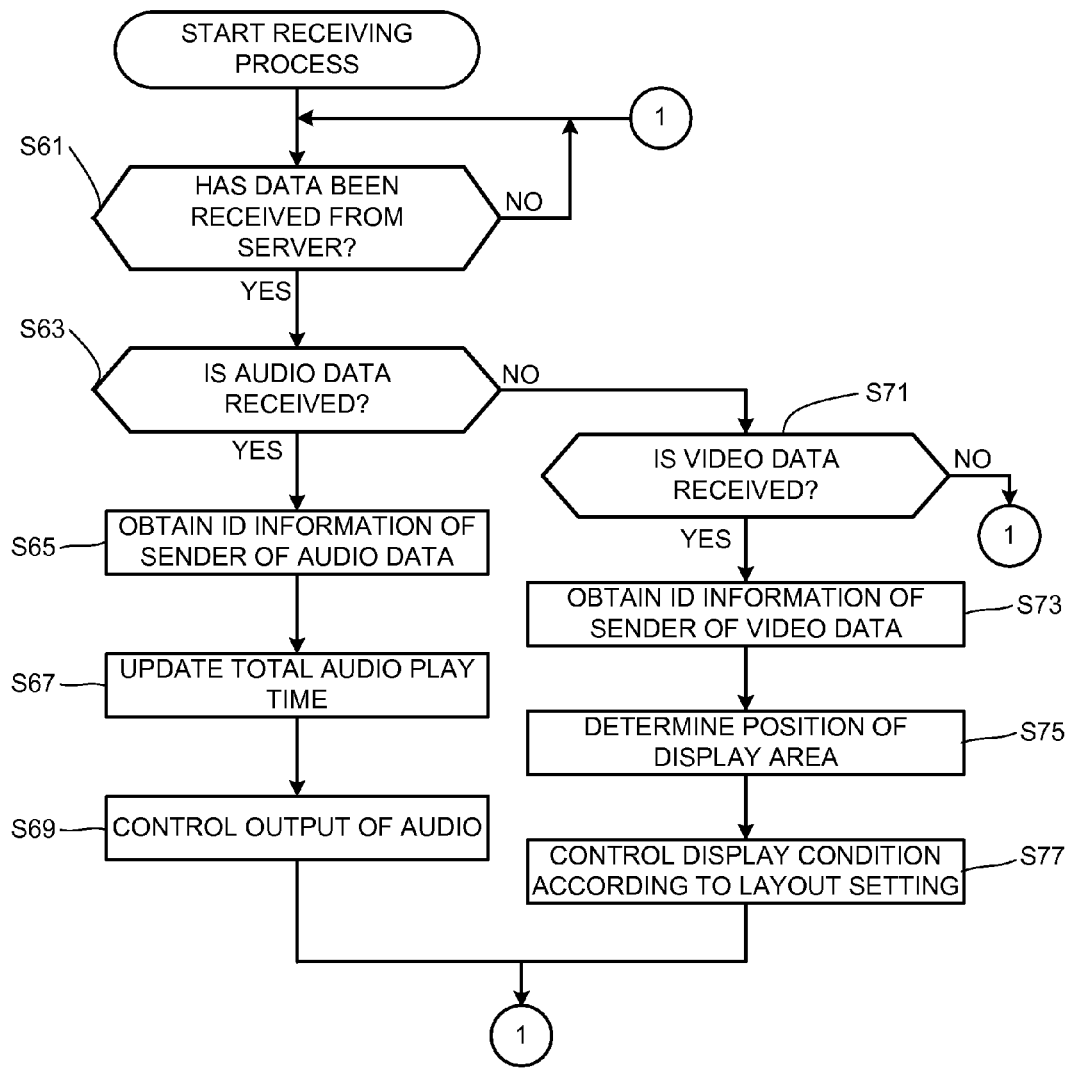
FIG. 10 is a flowchart depicting an example receiving processing in the illustrative embodiment according to one or more aspects of the disclosure.

Receiving processing will be described referring to FIG. 10. The receiving processing is repeatedly executed at regular intervals until the communication device 30 is disconnected from the particular conference room after establishing the connection thereto. Subsequent to starting the receiving processing, the CPU 32 judges whether the predetermined data transmitted from the server 20 has been received (e.g., obtained via the communication unit 54) (e.g., step S61). When the CPU 32 judges that the predetermined data has not been received yet (e.g., NO in step S61), the CPU 32 repeatedly executes this judgment step.

When the CPU 32 judges that the predetermined data has received (e.g., YES in step S61), the CPU 32 judges whether the received data is audio data (e.g., step S63). When the CPU 32 judges that the received data is audio data (e.g., YES in step S63), the CPU 32 obtains the ID information of the communication device that is a sender of the audio data (e.g., step S65). For example, when the received data is audio data transmitted from the communication device 71, the CPU 32 obtains the ID information of the communication device 71 assigned to the audio data. When the received data is audio data transmitted from the communication device 74, the CPU 32 obtains the ID information of the communication device 74 assigned to the audio data.

Subsequently, the CPU 32 accesses the status table stored in the RAM 36 to update the total audio play time associated with the obtained ID information (e.g., step S67). As described above, audio data transmitted and received in the remote conference system 10 is data having a play duration of a predetermined certain length. Therefore, the CPU 32 adds the play time to the total audio play time stored with being associated with the ID information obtained in step S65. In an example, it is assumed that audio data has a play time of 20 msec. and the ID information of the communication device 71 has been obtained in step S65. In this case, the CPU 32 adds 0.02 sec to the total audio play time associated with the ID information of the communication device 71 in the status table. In another example, it is assumed that audio data has a play time of 20 msec. and the ID information of the communication device 74 has been obtained in step S65. In this case, the CPU 32 adds 0.02 sec to the total audio play time associated with the ID information of the communication device 74 in the status table.

The CPU 32 controls output of audio corresponding to the received audio data (e.g., step S69). In step S69, the CPU 32 reproduces audio from the received audio data (e.g., decodes the received audio data) and outputs, to the audio device 48, an instruction to output the reproduced audio. In response to the output instruction, the audio device 48 outputs audio corresponding to the audio data through the speaker 49. When audio data transmitted from the communication device 71 has been received while the display 38 is in a state depicted in the upper drawing of FIG. 2, audio including voice of a user of the communication device 71 is outputted through the speaker 49. When audio data transmitted from the communication device 74 has been received while the display 38 is in a state depicted in the upper drawing of FIG. 2, audio including voice of a user of the communication device 74 is outputted through the speaker 49. In other words, in the communication device 30, audio corresponding to each audio data received from each of the communication devices 71, 72, 73, 74, and 75 is outputted through the speaker 49 regardless of whether the captured images 381, 382, 383, 384, and 385 of the communication devices 71, 72, 73, 74, and 75 are displayed or hidden. Subsequent to step S69, the routine returns to step S61 and the CPU 32 executes step S61 and subsequent steps again.

When the received data is not audio data (e.g., NO in step S63), the CPU 32 judges whether the received data is video data (e.g., step S71). When the received data is not video data (e.g., NO in step S71), the CPU 32 executes processing appropriate for the received data as necessary. Subsequently, the routine returns to step S61 and the CPU 32 executes step S61 and subsequent steps again.

When the received data is audio data (e.g., YES in step S71), the CPU 32 obtains the ID information of the communication device that is a sender of the video data (e.g., step S73). For example, when the received data is video data transmitted from the communication device 71, the CPU 32 obtains the ID information of the communication device 71 assigned to the video data. When the received data is video data transmitted from the communication device 75, the CPU 32 obtains the ID information of the communication device 75.

The CPU 32 determines a position of the display area for the received video data in the video layout region A (e.g., step S75). In one example, it is assumed that audio data transmitted from the communication device 71 has been received while the display 38 is in the state depicted in the upper drawing of FIG. 2. In step S75, as a first step, the CPU 32 identifies the area A1, which is associated with the sender-device's ID information "71" (refer to FIG. 3) obtained along with the video data transmitted from the communication device 71, in the video layout region A. As a second step, the CPU 32 identifies the areas A1 and A2 of the video layout region A positioned within the video display region B. Then, the CPU 32 determines whether a particular area is identified in both the first and second steps. In this case, the area A1 is identified in both the first and second steps. Therefore, the CPU 32 determines that the area A1 is positioned within the video display region B.

In another example, it is assumed that video data transmitted from the communication device 75 has been received while the display 38 is in the state depicted in the upper drawing of FIG. 2. In this case, in step S75, as a first step, the CPU 32 identifies the area A5 in the video layout region A associated with the sender-device's ID information "75" (refer to FIG. 3). As a second step, the CPU 32 identifies the areas A1 and A2 of the video layout region A positioned within the video display region B. Then, the CPU 32 determines whether a particular area is identified in both the first and second steps. In this case, the area A5 is not identified in both the first and second steps. Therefore, the CPU 32 determines that the area A5 is positioned out of the video display region B.

Subsequently, the CPU 32 controls the display condition according to the layout setting (e.g., step S77). During this control, the CPU 32 executes processing based on the determination result made in step S75. For example, when the received data is video data transmitted from the communication device 71, the CPU 32 controls the display condition of the captured image 381 based on the determination result that the received video data is positioned within the video display region B. The CPU 32 reproduces video based on the video data transmitted from the communication device 71 and obtains the captured image 381. Subsequently, the CPU 32 outputs, to the display 38, an instruction to output the captured image 381. In response to the output instruction, the display 38 displays the captured image 381 newly obtained, in the area A1. Subsequent to step S77, the routine returns to step S61 and the CPU 32 executes step S61 and subsequent steps.

When the determination result made in step S75 indicates that the received video data is positioned out of the video display region B, the routine skips step S77. For example, when the received data is video data transmitted from communication device 75, the CPU 32 does not execute the control of the display condition of the captured image 385 corresponding to video data transmitted from the communication device 75. Subsequent to step S75, the routine skips step S77 and returns to step S61.

<Processing Executed in Server>

Processing executed in the server 20 during the remote conference will be described. Each processing described below is executed for one or more of the communication devices 30, 71, 72, 73, 74, and 75, which are connected to the same conference room. In description of processing executed in server 20, one or more or all of the communication devices 30, 71, 72, 73, 74, and 75 may refer to "communication device or communication devices" without reference numerals.

<Transferring Processing>

Transferring processing will be described referring to FIGS. 11 and 12. The transferring processing is repeatedly executed until all of one or more of the communication devices 30, 71, 72, 73, 74, and 75 disconnect from the particular conference room after one of the one or more communication devices 30, 71, 72, 73, 74, and 75 connects to the particular conference room. Subsequent to starting the transferring processing, the CPU 22 judges whether the predetermined data transmitted from one of the communication devices 30, 71, 72, 73, 74, and 75 has been received (e.g., obtained via the communication unit 28) (e.g., step S81). When the CPU 22 judges that the predetermined data has not been received (e.g., NO in step S81), the CPU 22 executes this judgment step repeatedly.

When the CPU 22 judges that the predetermined data has been received (e.g., YES in step S81), the CPU 22 judges whether the received data is the update frequency setting (e.g., step S83). When the CPU 22 judges that the received data is the update frequency setting (e.g., YES in step S83), the CPU 22 stores the update frequency setting (e.g., step S85). The update frequency setting is stored in the RAM 26 with being associated with the ID information of the sender device that has sent the update frequency setting (refer to FIG. 13). The ID information of the sender device is received by the communication unit 28 along with the update frequency setting. The CPU 22 obtains the ID information via the communication unit 28 along with the update frequency setting.

In FIG. 13, "ID information (target)" corresponds to "ID information (target)" included in the update frequency setting. In the illustrative embodiment, each communication device obtains a captured image of own device from video data obtained in itself without the captured image passing through the server 20. Therefore, the update frequency setting transmitted from each of the communication devices, i.e., the update frequency setting of the sender device, might not include the update frequency information for own device (refer to FIG. 6; when the communication device 30 is a sender device). Therefore, as depicted in FIG. 13, there is no update frequency information for the "ID information (target)" stored with respect to the sender-device's ID information. The update frequency setting (refer to FIG. 6) received from the communication device 30 is the update frequency setting transmitted by the communication device 30 in step S17 of FIG. 4. The update frequency settings received from the communication devices 71, 72, 73, 74, and 75 are the update frequency settings transmitted from the communication devices 71, 72, 73, 74, and 75, respectively, in a step corresponding to step S17 of FIG. 4.

When the received data is not the update frequency setting (e.g., NO in step S83), the CPU 22 judges whether the received data is video data (e.g., step S87). When the received data is not video data (e.g., NO in step S87), the routine proceeds to step S109 of FIG. 12. When the received data is video data (e.g., YES in step S87), the CPU 22 obtains the ID information and the image type information which are assigned to the video data (e.g., step S89). The video data received from the communication device 30 is the video data transmitted from the communication device 30 in step S47 of FIG. 8. The video data of the communication devices 71, 72, 73, 74, and 75 received from the communication devices 71, 72, 73, 74, and 75 are the video data transmitted from the communication devices 71, 72, 73, 74, and 75, respectively, in a step corresponding to step S47 of FIG. 8. The CPU 22 stores the obtained ID information and compressed image information in the RAM 26.

The CPU 22 judges whether the compressed image included in the video data is I-frame (e.g., step S91). This judgment is made based on the image type information obtained in step S89. When the CPU 22 judges that the compressed image is I-frame (e.g., YES in step S91), the CPU 22 obtains bandwidth provided for the sender device of the video data (e.g., step S93). The bandwidth is calculated by dividing a total data amount of all compressed image data received between after last time reception of I-frame and before this time reception of I-frame in one communication device by a time elapsed between after last time reception of I-frame and before this time reception of I-frame.

In order to calculate the bandwidth, the CPU 22 obtains the total data amount and the elapsed time. The total data amount is obtained, for example, as described below. Once the CPU 22 obtains an I-frame from a predetermined communication device, every time the CPU 22 obtains a compressed image from the predetermined communication device, the CPU 22 adds an amount of data of the received compressed image. The adding of the amount of data is continued until the CPU 22 receives another I-frame from the predetermined communication device. When the CPU 22 newly receives an I-frame from the predetermined communication device, the CPU 22 adds the amount of data of the newly-received I-frame to an accumulated value to obtain the total data amount. The CPU 22 resets the accumulated value as the CPU 22 obtains the total data amount. Subsequent to resetting the accumulated value, the CPU 22 starts adding a data mount of a received compressed image. The elapsed time is obtained based on a difference between a timing at which the CPU 22 receives an I-frame last time and a timing at which the CPU 22 receives another I-frame this time in accordance with the storing executed in step S107. The CPU 22 stores the bandwidth obtained in step S91 in the RAM 26 with being associated with the ID information obtained in step S89.

Figure 11:
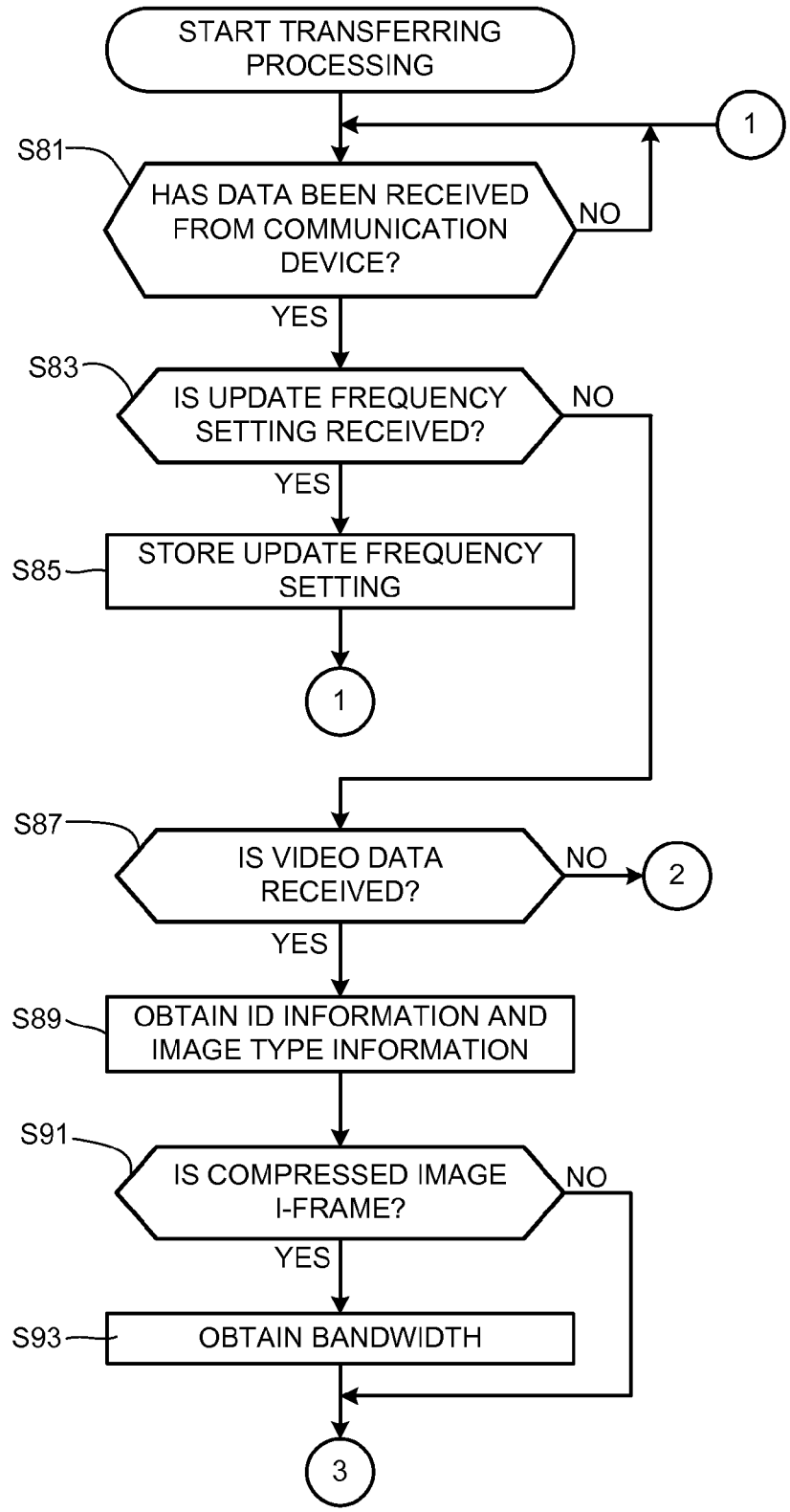
FIG. 11 is a flowchart depicting an example transferring processing in the illustrative embodiment according to one or more aspects of the disclosure.

When the CPU 22 judges that the compressed image is not I-frame (e.g., NO in step S91), or subsequent to step S93, the CPU 22 judges whether steps S97 to S107 have already been executed for all the communication devices that are connected to the particular conference room, other than the communication device identified by the ID information obtained in step S89 of FIG. 11 (e.g., step S95). Steps S97 to S107 are a series of processing for transmitting video data selectively. The CPU 22 judges, for example, whether the received video data (refer to YES in step S87 of FIG. 11) is video data to be transmitted for each destination device on communication-device basis. When the CPU 22 judges the received video data is video data to be transmitted for each destination device, the CPU 22 transmits the video data to one or more destination devices. Steps S97 to S107 are executed for all the communication devices that are connected to the particular conference room, other than the communication device identified by the ID information that has been obtained in step S89 of FIG. 11. When the CPU 22 judges that there is no communication device on which steps S97 to S107 have not been executed yet, i.e., steps S97 to S107 have already been executed for all the communication devices (e.g., YES in step S95), the routine returns to step S81 of FIG. 11 and the CPU 22 executes processing of step S81 and subsequent steps. When the CPU 22 judges that there is one or more communication devices on which steps S97 to S107 have not been executed yet, i.e., steps S97 to S107 have not been executed for all the communication devices (e.g., NO in step S95), the CPU 22 selects one of the one or more communication devices as a target to be processed (e.g., step S97). For example, it is assumed that the received video data is video data transmitted from the communication device 71, i.e., the CPU 22 has obtained the ID information of the communication device 71 in step S89 of FIG. 11. When steps S97 to S107 have not yet been executed for the communication devices 30 and 75 although steps S97 to S107 have already been executed for the communication devices 72, 73, and 74, one of the communication devices 30 and 75, e.g., the communication device 30, is selected as a target to be processed.

Subsequently, the CPU 22 executes a transfer determining processing (e.g., step S101). A detail of the transfer determining processing will be described later. Subsequent to the transfer determining processing, the CPU 22 judges whether the determination result stored in the RAM 26 indicates that it is necessary to transfer the received video data (hereinafter, referred to as "transfer necessary") (e.g., step S103). When the CPU 22 judges that the determination result indicates "transfer necessary" (e.g., YES in step S103), the CPU 22 controls transmission of the received video data (e.g., step S105). The communication device that is a target to be processed is determined as the destination of the video data. Subsequently, the CPU 22 stores the ID information of the sender device that has transmitted the video data, the ID information of the destination device, a transmission time, and the image type information, for the transmission in step S105 (e.g., step S107). The sender-device's ID information, the destination-device's ID information, the transmission time, and the image type information are stored in a transmission table (not depicted) stored in the RAM 26, for example.

Details of steps S105 and S107 will be described below assuming that the received video data is video data transmitted from the communication device 71, the ID information of the communication device 71 is obtained in step S89 of FIG. 11, and the communication device 30 is selected as a target to be processed in step S97. In step S105, the CPU 22 determines the communication device 30 as a destination of the video data and outputs, to the communication unit 28, an instruction to transmit the video data received from the communication device 71. Thus, the video data received from the communication device 71 is transmitted to the communication device 30 from the communication unit 28. In step S107, the CPU 22 stores the ID information of the communication device 71, the ID information of the communication device 30, a transmission time, and the image type information in the transmission table stored in the RAM 26.

When the CPU 22 judges that the determination result indicates it is unnecessary to transfer the received video data (hereinafter, referred to as "transfer unnecessary") (e.g., NO in step S103), or subsequent to step S107, the routine returns to step S95 and the CPU 22 executes step S95 and subsequent steps.

In step S109, the CPU 22 judges whether the received data is audio data. When the CPU 22 judges that the received data is not audio data (e.g., step NO in S109), the CPU 22 executes processing appropriate for the received data. Subsequently, the routine returns to step S81 of FIG. 11 and the CPU 22 executes step S81 and subsequent steps.

When the CPU 22 judges that the received data is audio data (e.g., YES in step S109), the CPU 22 controls transmission of the audio data (e.g., step S111). The audio data transmitted from the communication device 30 is the audio data transmitted by the communication device 30 in step S59 of FIG. 9. The audio data transmitted from each of the communication devices 71, 72, 73, 74, and 75 is the audio data transmitted by each of the communication devices 71, 72, 73, 74, and 75 in a step corresponding to step S59 of FIG. 9. All of the one or more communication devices identified by the respective ID information, other than the ID information of the communication device assigned to the audio data, are determined as a destination of the audio data. For example, it is assumed that the received data is audio data transmitted from the communication device 30. In this case, the CPU 22 determines the communication devices 71, 72, 73, 74, and 75 identified by the respective ID information that are different from the ID information of the communication device 30 assigned to the audio data, as a destination of the video data. Subsequently, the CPU 22 outputs, to the communication unit 28, an instruction to transmit the audio data received from the communication device 30. Thus, the audio data received from the communication device 30 is transmitted to each of the communication devices 71, 72, 73, 74, and 75 from the communication unit 28. Subsequent to step S111, the routine returns to step S81 of FIG. 11 and the CPU 22 executes step S81 and subsequent steps.

<Transfer Determining Processing>

The transfer determining processing executed in step S101 (refer to FIG. 12) of the transferring processing in FIGS. 11 and 12 will be described referring to FIG. 14. In the description for the transfer determining processing and update frequency correcting processing (refer to FIG. 15), the video data that contributes to the positive judgment in step S87 of FIG. 11 (e.g., YES in step S87) is referred to as "new video data".

Subsequent to starting the transfer determining processing, the CPU 22 executes the update frequency correcting processing (e.g., step S121). A detail of the update frequency correcting processing will be described later. The CPU 22 obtains the update frequency information for ID information (target), which is associated to the ID information (sender) in the update frequency setting (refer to FIG. 13) (e.g., step S123).

The CPU 22 judges whether the update frequency information obtained in step S123 indicates that the compressed image in the new video data is determined as a non-target for transmission (e.g., step S125). The type of the compressed image in the new video data is identified based on the image type information obtained in step S89 of FIG. 11. When the CPU 22 judges that the update frequency information indicates that the compressed image in the new video data is not determined as a non-target for transmission (e.g., NO in step S125), the CPU 22 judges whether a value representing a time period elapsed between a timing of the last-time transmission of an I-frame and a timing of execution of step S127, i.e., the current time, is greater than a value representing the minimum I-frame transmission interval specified in the update frequency information obtained in step S123 (e.g., step S127).

For example, step S127 is executed as described below. The CPU 22 identifies the transmission time of the last-time transmission of an I-frame from the transmission table stored in the RAM 26 in which various information has been stored in step S107 of FIG. 12. The ID information obtained in step S89 of FIG. 11 as the ID information of the sender device of the video data, and the ID information of the communication device selected in step S97 of FIG. 12 as the ID information of the destination of the video data are associated with the last I-frame of which transmission time has been identified. The CPU 22 obtains the current time from the timer 27. In the identification of the transmission time of the last-time transmission of the I-frame, the type of the compressed image is determined based on the image type information stored in the transmission table. The CPU 22 obtains an elapsed time based on the last transmission time and the current time to determine the relationship between the elapsed time and the minimum I-frame transmission interval. When the CPU 22 judges that the value representing the elapsed time is greater than the value representing the minimum I-frame transmission interval, the CPU 22 makes a positive judgment in step S127 (e.g., YES in step S127). When the value representing the elapsed time is smaller than or equal to the value representing the minimum I-frame transmission interval, the CPU 22 makes a negative judgment in step S127 (e.g., NO in step S127). In other embodiments, for example, when the value representing the elapsed time is equal to the value representing the minimum I-frame transmission interval, the CPU 22 may make a positive judgment in step S127 (e.g., YES in step S127).

When the CPU 22 makes a positive judgment in step S127 (e.g., YES in step S127), the CPU 22 stores a determination result indicating "transfer necessary" in the RAM 26 (e.g., step S129). When the compressed image in the new video data is a compressed image type that does not relate to the minimum I-frame transmission interval, the CPU 22 makes a positive judgment in step S127 (e.g., YES in step S127) and the CPU 22 stores a determination result indicating "transfer necessary" in the RAM 26 in step S129. In the illustrative embodiment, the minimum interval is the minimum I-frame transmission interval. Therefore, the compressed image type that does not relate to the minimum I-frame transmission interval may be a P-frame or a B-frame. When the CPU 22 makes a positive judgment in step S125 (e.g., YES in step S125) or when the CPU 22 makes a negative judgment in step S127 (e.g., NO in step S127), the CPU 22 stores a determination result indicating "transfer unnecessary" in the RAM 26 (e.g., step S131).

Steps S123 to S131 will be described assuming that the new video data is video data received from the communication device 73, the ID information of the communication device 73 is obtained in step S89 of FIG. 11, and the communication device 30 is selected as a target to be processed in step S97 of FIG. 12. In the update frequency setting associated with the ID information of the communication device 30, the update frequency information for the ID information of each of the communication devices 71, 72, 73, 74, and 75 is as shown in FIG. 13. In step S123, the CPU 22 obtains the update frequency information for the ID information "73", associated with the ID information of the communication device 30 (sender), based on the update frequency setting (FIG. 13) stored in the RAM 26. According to the update frequency setting depicted in FIG. 13, in this case, the CPU 22 obtains the update frequency level "3".

When the CPU 22 judges that the compressed image in the new video data is I-frame, the CPU 22 makes a negative judgment in step S125 (e.g., NO in step S125). When 300 msec. has elapsed from the transmission time of the last-time transmission of an I-frame (e.g., YES in step S127), the CPU 22 stores a determination result indicating "transfer necessary" in the RAM 26 (e.g., step S129). When 300 msec. has not yet elapsed from the transmission time of the last-time transmission of an I-frame (e.g., NO in step S127), the CPU 22 stores a determination result indicating "transfer unnecessary" in the RAM 26 (e.g., step S131). When the compressed image in the new video data is one of P-frame and B-frame, the CPU 22 makes a positive judgment in step S125 (e.g., YES in step S125) and stores a determination result indicating "transfer unnecessary" in the RAM 26 (e.g., step S131).

Figure 12:
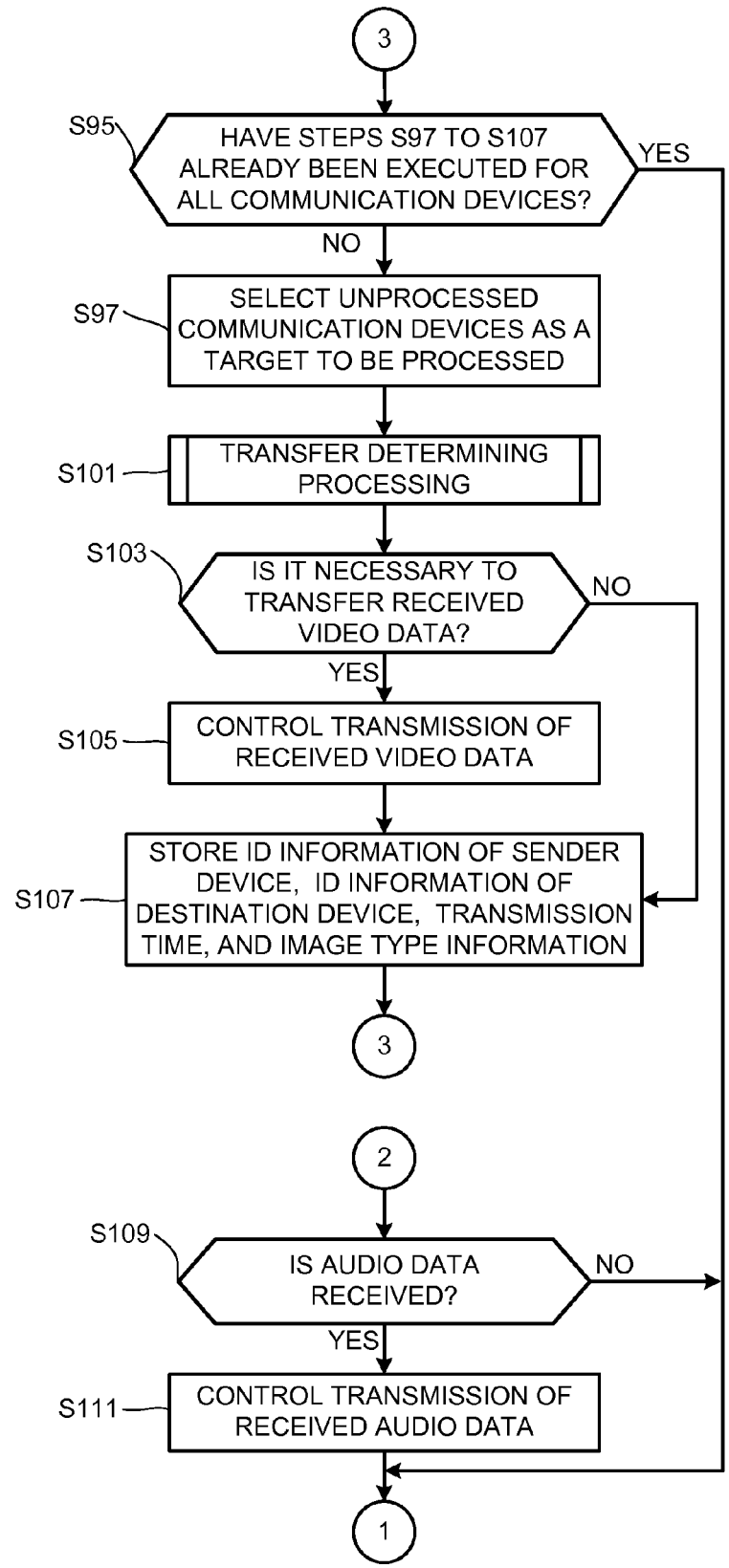
FIG. 12 is a continuation of the flowchart depicting the example transferring processing of FIG. 11 in the illustrative embodiment according to one or more aspects of the disclosure.

Subsequent to step S129 or S131, the CPU 22 ends the transfer determining processing, and the routine returns to step S103 of FIG. 12.

<Update Frequency Correcting Processing>

The update frequency correcting processing executed in step S121 of the transfer determining processing in FIG. 14 will be described referring to FIG. 15. Subsequent to starting the update frequency correcting processing, the CPU 22 judges whether the bandwidth obtained in step S93 of FIG. 11 is greater than or equal to a threshold value (e.g., step S141). For example, the threshold value may be 1 Mbps. The threshold value is stored in the storage device 24 with being associated with the programs for executing the update frequency determining processing. When the CPU 22 judges that the bandwidth is greater than or equal to the threshold value (e.g., YES in step S141), the CPU 22 raises, by one level, the update frequency level designated for the update frequency information (e.g., step S143). The update frequency information whose level is to be raised is the update frequency information for the ID information (target) stored in step S89 of FIG. 11, associated with the ID information (sender) of the communication device selected in step S97 of FIG. 12 in the update frequency setting (refer to FIG. 13).

For example, it is assumed that the new video data is video data received from the communication device 74, the ID information of the communication device 74 is obtained in step S89 of FIG. 11, and the communication device 30 is selected as a target to be processed in step S97 of FIG. 12. Example update frequency information for the ID information of each of the communication devices 71, 72, 73, 74, and 75, associated with the ID information of the communication device 30 in the update frequency setting is as shown in FIG. 13. The CPU 22 raises the update frequency level "1" designated for the target ID information "74", associated with the ID information "30" of the communication device 30, by one level to update the update frequency level to level "2".

Figure 14:
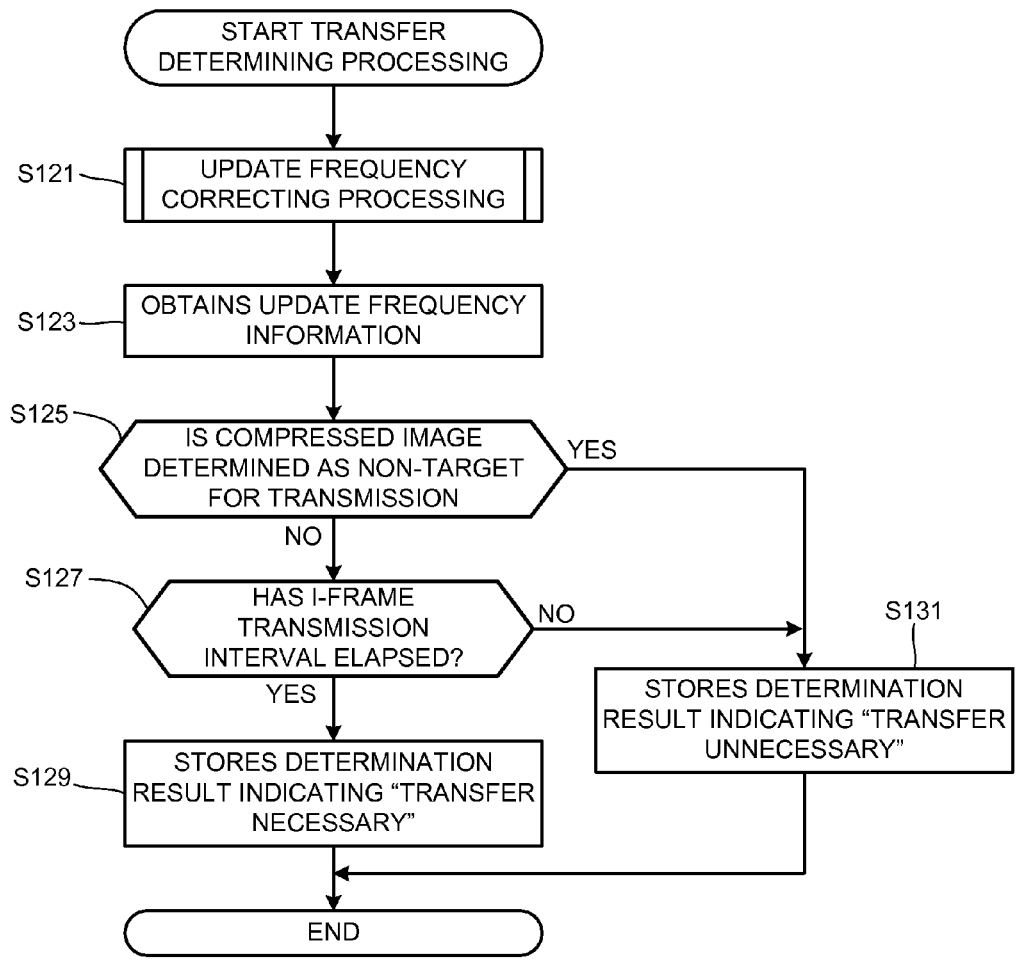
FIG. 14 is a flowchart depicting an example transfer determining processing in the illustrative embodiment according to one or more aspects of the disclosure.

When the CPU 22 judges that the bandwidth is smaller than the threshold value (e.g., NO in step S141), or subsequent to step S143, the CPU 22 ends the update frequency correcting processing and the routine returns to step S123 of FIG. 14. When the update frequency information of which level is a target to be raised in step S143 indicates the update frequency level "5", the CPU 22 makes a positive judgment in step S141 (e.g., YES in step S141), and then the routine skips step S143 and returns to step S123 of FIG. 14.

Effects of Illustrative Embodiment

According to the illustrative embodiment, one or more effects described below are obtained.

Figure 7:
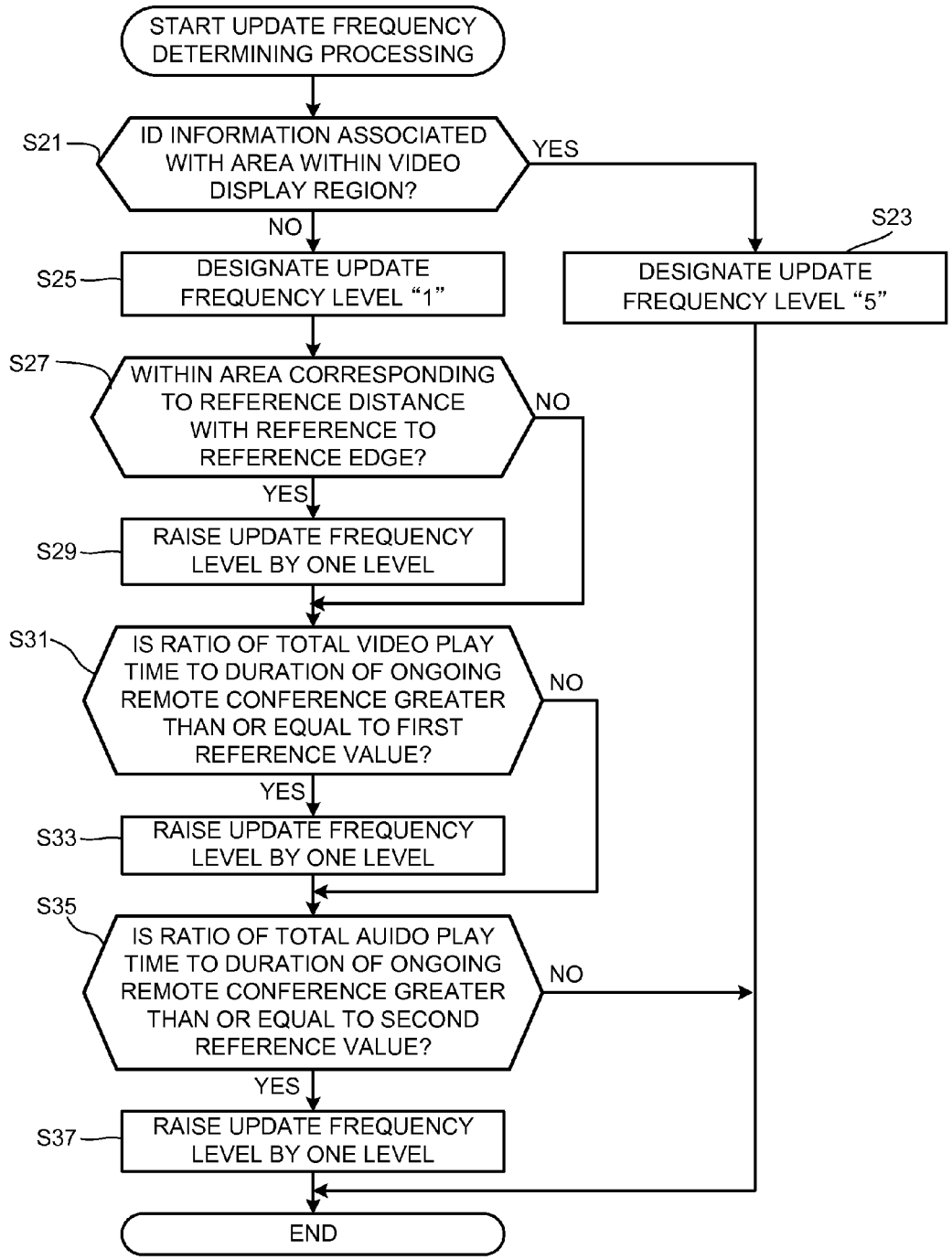

(1) In the communication device 30, it is judged whether the ID information of the communication device which is a target for the update frequency determining processing is associated with a particular area determined as an area of the video layout region A positioned within the display area of the video display region B in step S11 of FIG. 4 (refer to step S21 in FIG. 7). When a positive judgment is made in step S21, the update frequency information is designated as the highest update frequency level "5" (refer to step S23). When a negative judgment is made in step S21, the update frequency information is designated as one of the update frequency levels "1", "2", "3", and "4", which are lower levels than the update frequency level "5" (refer to step S25, S29, S33 or S37). In the update frequency transmitting processing depicted in FIG. 4, the update frequency setting (refer to FIG. 6) including the update frequency information designated to the respective communication devices 71, 72, 73, 74, and 75 is transmitted to the server 20 (refer to step S17 in FIG. 4).

In the server 20, a determination is made based on the update frequency setting (refer to FIG. 13) (refer to step S125 or S127 in FIG. 14). One of the determination result indicating "transfer necessary" and the determination result indicating "transfer unnecessary" is stored (refer to step S129 or step S131). In the server 20, when the determination result indicates "transfer necessary" (e.g., YES in step S103 in FIG. 12), video data is transmitted to the communication device determined as a target to be processed in step S97 of FIG. 12 (refer to step S105 in FIG. 12). When the determination result indicates "transfer unnecessary" (e.g., NO in step S103 in FIG. 12), transmission of video data is not performed (e.g., NO in step S103 in FIG. 12).

Therefore, this configuration may enable to determine compressed images of particular types as a non-target for transmission, in video data corresponding to a captured image that is not displayed within the video display region B of the display 38 of the communication device 30. That is, this configuration may disable the server 20 to transmit, to the communication device 30, video data including the compressed images determined as a non-target for transmission.

When the update frequency information indicating one of the update frequency levels "2", "3", and "4" is designated to a hidden captured image in the communication device 30 (refer to NO in step S21 in FIG. 7) (refer to step S29, step S33 or step S37 in FIG. 7), video data, which corresponds to the hidden captured image and includes at least I-frames, is transmitted from the server 20 to the communication device 30 (refer to FIG. 5, NO in step S125 in FIG. 14 and step S129, YES in step S103 in FIG. 12 and step S105). When a positive judgment is made in at least one of steps S27, S31, and S35 of the update frequency determining processing, the update frequency information is designated as one of the update frequency levels "2", "3", and "4". Therefore, for example, when a swiping operation is performed in order to display a hidden captured image, the video data including the compressed image that is a target for transmission is obtained (refer to YES in step S71 in FIG. 10) and thus the captured image that includes the compressed image and corresponds to the video data may be displayed in the communication device 30 (refer to step S77 in FIG. 10). Therefore, this configuration may enable to display a hidden captured image smoothly while restricting increase of the amount of video data to be communicated.

(2) It is judged that whether a particular area of the video layout region A associated with the ID information of the communication device targeted for processing is positioned within an area corresponding to the reference distance WC (refer to FIG. 2) with reference to the reference edge in the direction opposite to the moving direction (refer to step S27 in FIG. 7). When the particular area of the video layout region A associated with the ID information of the communication device targeted for processing is positioned within the area corresponding to the reference distance WC with reference to the reference edge (refer to YES in step S27), the update frequency level designated for the update frequency information is raised by one level (refer to step S29). Therefore, the update frequency level designated for the update frequency information for video data corresponding to the captured image that is not displayed within the video display region B with reference to the reference distance WC may be raised from the update frequency level "1" to the update frequency level "2". Since the update frequency information is designated as the update frequency level "2", an I-frame is determined as a target for transmission. Therefore, when the hidden captured image is displayed, the captured image may be displayed owing to receipt of I-frames. In the illustrative embodiment, both the moving direction and the direction opposite to the moving direction may be referred to as a direction corresponding to the moving direction. The direction corresponding to the moving direction may be, for example, the horizontal direction (refer to FIG. 2).

(3) It is judged whether the ratio of the total video play time associated with the ID information of the communication device targeted for processing to the duration of the ongoing remote conference is greater than or equal to the first reference value (refer to step S31 in FIG. 7). When the ratio is greater than or equal to the first reference value (e.g., YES in step S31), the update frequency level designated for the update frequency information is raised by one level (refer to step S33). Therefore, the update frequency information for video data corresponding to the captured image that is not displayed within the video display region B may be changed appropriate to the total video play time. For example, when step S29 has not been executed, the update frequency level designated for the update frequency information is changed from the update frequency level "1" to the update frequency level "2". When step S29 has already been executed, the update frequency level designated for the update frequency information is changed from the update frequency level "2" to the update frequency level "3". At the update frequency level "2" or "3", an I-frame determined as a target for transmission may enable the captured image to be displayed. Raising the update frequency level designated for the update frequency information from the update frequency level "2" to the update frequency level "3" may enable to shorten the minimum I-frame transmission interval (e.g., 1700 msec. shortened), whereby the image switching interval of the captured image in display duration of one frame may be shortened. Thus, reproduction quality may be increased.

(4) It is judged whether the ratio of the total audio play time associated with the ID information of the communication device targeted for processing to the duration of the ongoing remote conference is greater than or equal to the second reference value (refer to step S35 in FIG. 7). When the ratio is greater than or equal to the second reference value (e.g., YES in step S35), the update frequency level designated for the update frequency information is raised by one level (refer to step S37). Therefore, the update frequency information for video data corresponding to the captured image that is not displayed within the video display region B may be changed appropriate to the total video play time. For example, when both steps S29 and S33 have not been executed, the update frequency level designated for the update frequency information is changed from the update frequency level "1" to the update frequency level "2". When one of step S29 and step S33 has been executed, the update frequency level designated for the update frequency information is changed from the update frequency level "2" to the update frequency level "3". When both steps S29 and S33 have been executed, the update frequency level designated for the update frequency information is changed from the update frequency level "3" to the update frequency level "4". At the update frequency level "2" or "3", an I-frame determined as a target for transmission may enable the captured image to be displayed. At the update frequency level "4", a P-frame is also determined as a target for transmission. Therefore a P-frame as well as an I-frame may enable the captured image to be displayed. Raising the update frequency level designated for the update frequency information from the update frequency level "3" to the update frequency level "4" may enable to shorten the minimum I-frame transmission interval (e.g., 300 msec. shortened) and to obtain P-frames, whereby the image switching interval of the captured image in display duration of one frame may be shortened. Thus, reproduction quality may be further increased. The effects obtained due to the raising of the update frequency information from the update frequency level "2" to the update frequency level "3" are as described above.

<Modifications>

One or more aspects of the disclosure according to the illustrative embodiment may be modified as described below. One or more aspects of the disclosure according to various modifications may be combined appropriately. Other embodiments that adopt one or more aspects described below may provide the same effects as the effects provided by the above-described embodiment.

(1) In the above-described illustrative embodiment, the video layout region A is defined by the layout setting that defines that the areas A1, A2, A3, A4, and A5 are arranged along the horizontal direction and the captured images 381, 382, 383, 384, and 385 are positioned in the areas A1, A2, A3, A4, and A5, respectively (refer to FIG. 2). In other embodiments, for example, the layout setting may define the video layout area such that the areas A1, A2, A3, A4, and A5 are arranged along the vertical direction and the captured images 381, 382, 383, 384, and 385 are positioned in the areas A1, A2, A3, A4, and A5, respectively, arranged along the vertical direction. In this case, elements corresponding to the widths WA and WB, the reference distance WC, and the distance WD with reference to the horizontal direction may be defined with reference to the vertical direction. The moving direction may include an upward direction and downward direction in the vertical direction. According to the drawing depicted in FIG. 2, the vertical direction is a direction perpendicular to the horizontal direction indicated by a bi-directional arrow.

(2) In the above-described illustrative embodiment, for the arrangement of the captured images 381, 382, 383, 384, and 385 in accordance with the layout setting, the areas A1, A2, A3, A4, and A5 are defined in the video layout region A (refer to FIG. 3). In other embodiments, for example, the areas in which the captured images 381, 382, 383, 384, and 385 are positioned, respectively, in the video layout region A may be identified using a coordinate system (refer to FIG. 16). In this case, a particular area of the video layout region A displayed within the video display region B may also be identified using the coordinate system. For example, as depicted in FIG. 16, whether or not a particular captured image corresponding to an ID information is displayed within the video display region B may be identified using an indication, for example, "Image Displayed: Yes/No".

In FIG. 16, values of "X" and "Y" indicate coordinates of a reference position in each area in which a corresponding one of the captured images 381, 382, 383, 384, and 385 is positioned. For example, the values of "X" and "Y" indicate coordinates of the position of a point corresponding to an upper left corner of the area in which a corresponding one of the captured images 381, 382, 383, 384, and 385 is positioned. The "width" and "height" indicate a dimension in the lateral direction and a dimension in the longitudinal direction of the area in which a corresponding one of the captured images 381, 382, 383, 384, and 385 is positioned. In the above-described embodiment, the areas A1, A2, A3, A4, and A5 (i.e., the captured images 381, 382, 383, 384, and 385) are elongated in the vertical direction (refer to FIG. 2). In an example depicted in FIG. 16, in contrast to the above-described embodiment, the areas in which the captured images are arranged respectively (i.e., the captured images) may be elongated in the horizontal direction.

The "X:10", "Y:30", "width:160" and "length:100" for the ID information "71" of FIG. 16 corresponds to the "area A1" of FIG. 2. The "X:180", "Y:30", "width:160" and "height:100" for the ID information "72" of FIG. 16 corresponds to the "area A2" of FIG. 2. The "X:10", "Y:30", "width:350" and "height:100" for the ID information "73" of FIG. 16 corresponds to the "area A3" of FIG. 2. The "X:520", "Y:30", "width:160" and "height:100" for the ID information "74" of FIG. 16 corresponds to the "area A4" of FIG. 2. The "X:690", "Y:30", "width:160" and "height:100" for the ID information "75" of FIG. 16 corresponds to the "area A5" of FIG. 2.

(3) In the above-described illustrative embodiment, when a negative judgment is made in step S21 of FIG. 7, the update frequency information is designated as the update frequency level "1" in step S25. When a negative judgment is made in each of steps S27, S31 and S35, the update frequency level designated for the update frequency information is raised by one level. In other embodiments, for example, the update frequency information may be updated using scores. In this case, for example, the update frequency information and a score are associated with each other such that "0 points" indicates the update frequency level "1", "20 points" indicates the update frequency level "2", "40 points" indicates the update frequency level "3", "60 points" indicates the update frequency level "4", and "80 points" indicates the update frequency level "5". The update frequency information may be designated in accordance with the score. For example, when a negative judgment is made in step S21, in step S25, the score is set to 0 points and this score is stored in the RAM 36. When a positive judgment is made in step S27, in step S29, the CPU 32 adds 20 points to the score. In this case, the score of "20 points" is stored in the RAM 36. When a positive judgment is made in step S31, in step S33, the CPU 32 adds "20 points" to the store stored in the RAM 36. When a positive judgment is made in step S35, in step S37, the CPU 32 adds "20 points" to the score stored in the RAM 36. Subsequently, the CPU 32 designates the update frequency information in accordance with the final score stored in the RAM 36. For example, when the final score stored in the RAM 36 is "60 points", the CPU 32 designates the update frequency information as the update frequency level "4" and determines the update frequency information as the update frequency level "4" in step S15 of FIG. 4.

In step S31, when the ratio of the total video play time associated with the ID information of the communication device targeted for processing to the duration of the ongoing remote conference is equal to the first reference value, a positive judgment is made. In other embodiments, for example, in step S31, a judgment may be made based on whether the ratio of the total video play time associated with the ID information of the communication device targeted for processing to the duration of the ongoing remote conference is greater than the first reference value. In other words, when the ratio is equal to the first reference value, a negative judgment may be made in step S31.

In step S35, when the ratio of the total audio play time associated with the ID information of the communication device targeted for processing to the duration of the ongoing remote conference is equal to the second reference value, a positive judgment is made. In other embodiments, for example, in step S35, a judgment may be made based on whether the ratio of the total audio play time associated with the ID information of the communication device targeted for processing to the duration of the ongoing remote conference is greater than the second reference value. In other words, when the ratio is equal to the second reference value, a negative judgment may be made in step S35.

The order in which judgments in steps S27, S31, and S35 are performed may be changed. In other embodiments, for example, the judgment performed in accordance with the condition of step S31 may be performed at the timing of step S27 executed in the above-described illustrative embodiment. The judgment performed in accordance with the condition of step S35 may be performed at the timing of step S31 executed in the above-described illustrative embodiment. The judgment performed in accordance with the condition of step S27 may be performed at the timing of step S35 executed in the above-described illustrative embodiment.

Figure 9:
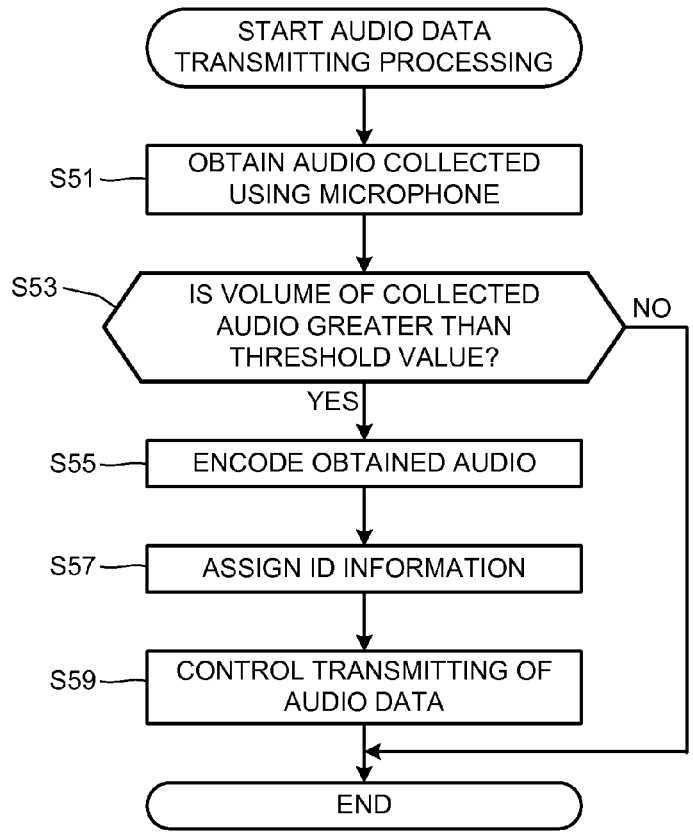
FIG. 9 is a flowchart depicting an example audio data transmitting processing in the illustrative embodiment according to one or more aspects of the disclosure.

(4) In the above-described illustrative embodiment, in step S53 of the audio data transmitting processing depicted in FIG. 9, when the value representing the volume of the audio obtained in step S51 is equal to the threshold value, a negative judgment is made. In other embodiments, for example, in step S53, a judgment may be made based on whether the value representing the volume of the audio obtained in step S51 is greater than or equal to the threshold value. In this case, when the value representing the volume is equal to the threshold value, a positive judgment may be made (e.g., YES in step S53).

(5) In the above-described illustrative embodiment, in step S93 (refer to FIG. 11), the bandwidth is obtained based on the interval of obtaining an I-frame. In other embodiments, for example, the bandwidth may be obtained, for example, on a group-of-pictures (GOP structure) basis. In the above-described illustrative embodiment, the description has been made in the case where the bandwidth of video data is used. In other embodiments, for example, instead of or in addition to video data, a bandwidth of other data communicated in the remote conference system 10 (e.g., audio data, common material data, or control data) may be used.

(6) In the above-described illustrative embodiment, a judgment is made in step S125 of FIG. 14 based on whether the update frequency information obtained in step S123 indicates the compressed image included in the new video data is determined as a non-target for transmission. In other embodiments, for example, in step S125, a judgment may be made based on whether the update frequency information obtained in step S123 indicates the compressed image included in the new video data is determined as a target for transmission. In this case, when the compressed image is determined as a target for transmission, the CPU 22 may make a positive judgment and the routine may proceed to step S127. When the compressed image is determined as a non-target for transmission, the CPU 22 may make a negative judgment and the routine proceed to step S131.

Figure 15:
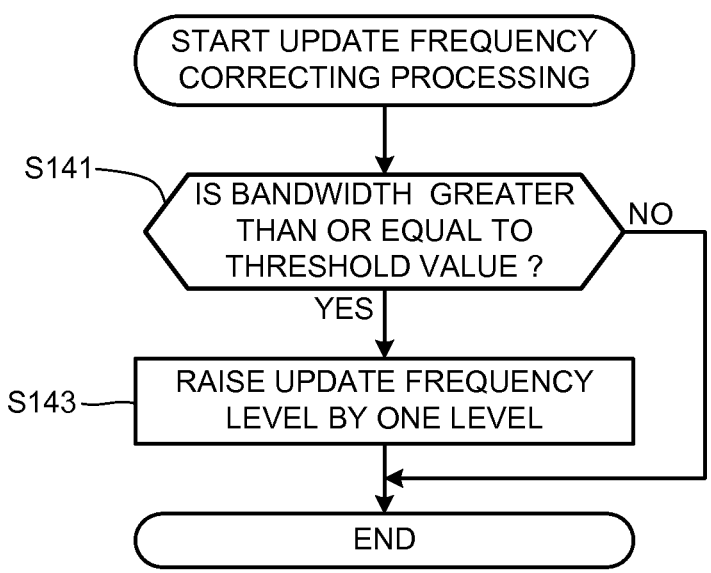
FIG. 15 is a flowchart depicting an example update frequency correcting processing in the illustrative embodiment according to one or more aspects of the disclosure.

(7) In the above-described illustrative embodiment, in step S141 of FIG. 15, when the value representing the bandwidth obtained in step S93 of FIG. 11 is equal to the threshold value, a positive judgment is made. In other embodiments, for example, in step S141, a judgment may be made based on whether the value representing the bandwidth obtained in step S93 of FIG. 11 is greater than the threshold value. In other words, when the value representing the bandwidth is equal to the threshold value, a negative judgment may be made in step S141.

(8) In the above-described illustrative embodiment, the server 20 transmits video data to each appropriate destination device. The sender device of the video data reproduces video from video data obtained therein and displays thereon a captured image of itself generated through the reproduction. In other embodiments, for example, the server 20 may be configured to transmit the video data to the sender device. In this case, the sender device may be configured to display a captured image corresponding to the received video data based on the own video data transmitted from the server 20. For example, in the communication device 30, the CPU 32 may be configured to execute the update frequency determining processing (FIG. 7) for the device itself in step S15 of the update frequency transmitting processing depicted in FIG. 4 as described above, and determine the update frequency information for own device. The update frequency setting (refer to FIG. 6) transmitted in step S17 of FIG. 5 includes the update frequency information associated with own ID information. In the server 20, the CPU 22 may be configured to determine the sender device that has transmitted the video data, as a device targeted for processing, in step S95 (refer to FIG. 12) and execute steps S97 to S107 for the sender device as described above.

(9) According to the above-described illustrative embodiments, in the remote conference system 10, video data and audio data transmitted from the communication device 30 are transmitted to each of the communication devices 71, 72, 73, 74, and 75 via the server 20 using the streaming method. Nevertheless, in other embodiments, for example, video data and audio data transmitted from the communication device 30 may be transmitted directly to each of the communication devices 71, 72, 73, 74, and 75 by bypassing the server 20. In other words, a remote conference system using a peer-to-peer ("P2P") technology may be within the scope of the disclosure.

In a case where a remote conference system uses the P2P technology, the CPU 32 of the communication device 30 may transmit the update frequency setting and own ID information via the communication unit 54 in step S17 (refer to FIG. 4). The update frequency setting and the ID information of the communication device 30 may be associated with the ID information of each of the communication devices 71, 72, 73, 74, and 75, which may be destination devices. In other words, the update frequency setting and the ID information of the communication device 30 may be transmitted directly to each of the communication devices 71, 72, 73, 74, and 75 associated with the update frequency setting and the ID information of the communication device 30 by bypassing the server 20. In each of the communication devices that receive the update frequency setting directly may be configured to execute processing corresponding to the transferring processing depicted in FIGS. 11 and 12, the transfer determining processing depicted in FIG. 14, and the update frequency correcting processing depicted in FIG. 15, instead of the server 20.

What is claimed is:

1. A non-transitory computer-readable medium storing computer readable instructions that, when executed by a processor of a communication device configured to conduct a remote conference via a network, perform a method comprising:

a first obtaining operation obtaining video data and identification information via a communication unit of the communication device connected to the network, the video data being based on an image captured in each of a plurality of other communication devices participating in the remote conference with the communication device, the video data including inter-frame coded image data and intra-frame coded image data, and the identification information identifying each of the plurality of other communication devices;

a display control operation displaying a first portion of a video layout region on a video display region of a display of the communication device, the first portion of the video layout region corresponding to the video display region and not displaying a second portion of the video layout region outside the video display region, a plurality of captured images being laid out in the video layout region, and each of the plurality of captured images being reproduced by the video data;

a judgment operation judging whether a specific captured image is included in the video display region based on a relationship between the video layout region and the video display region, the specific captured image being one of the plurality of captured images; and a determining operation determining update frequency information in response to the judgment operation judging that the specific captured image is positioned outside the video display region, the update frequency information indicating a timing at which specific video data corresponding to the specific captured image positioned outside the video display region is to be updated, the update frequency information setting at least a portion of the inter-frame coded image data included in the specific video data as a non-target for transmission, the specific video data being video data that reproduces the specific captured image.

2. The non-transitory computer-readable medium according to claim 1, wherein the method further comprises:

a transmission control operation controlling transmission of the update frequency information, identification information identifying the communication device and specific identification information via the communication unit, the specific identification information being identification information identifying one of the other communication devices from which the specific video data is transmitted.

3. The non-transitory computer-readable medium according to claim 1, wherein the determining operation further comprises determining all of the inter-frame coded image data included in the specific video data as a non-target for transmission.

4. The non-transitory computer-readable medium according to claim 1, wherein the determining operation further comprises:

determining the update frequency information to set a portion of the inter-frame coded image data as a non-target for transmission to be a first interval for the video data corresponding to captured images positioned outside the video display region and less than a specific distance from the video display region in a moving direction of the captured images; and determining the update frequency information to set a portion of the inter-frame coded image data as a non-target for transmission to be a second interval for the video data corresponding to captured images positioned outside the video display region and further than the specific distance from the video display region in the moving direction, the second interval being greater than the first interval.

5. The non-transitory computer-readable medium according to claim 4, wherein the specific distance corresponds to a width of the video display region in the moving direction.

6. The non-transitory computer-readable medium according to claim 1, wherein the method further comprises:

a storing operation storing a total video play time of the video data and the identification information in association with each other, the total video play time indicating a total display duration of each of the captured images in the video display region, wherein the determining operation further comprises:

determining the update frequency information to set a portion of the inter-frame coded image data as a non-target for transmission to be a first interval for the video data transmitted from one of the other communication devices identified by identification information associated with a first total video play time; and determining the update frequency information to set a portion of the inter-frame coded image data as a non-target for transmission to be a second interval for the video data transmitted from one of the other communication devices identified by identification information associated with a second total video play time.

7. The non-transitory computer-readable medium according to claim 6, wherein the first total video play time is greater than the second total video play time, and wherein the first interval is less than the second interval.

8. The non-transitory computer-readable medium according to claim 1, wherein the determining operation further comprises determining the update frequency information for setting a portion of the intra-frame coded image data as a non-target for transmission for the video data corresponding to captured images positioned outside the video display region.

9. The non-transitory computer-readable medium according to claim 1, wherein the method further comprises:

a second obtaining operation obtaining audio data and the identification information via the communication unit, the of audio data being based on audio from each of the plurality of other communication devices; and a storing operation storing a total audio play time of the audio data and the identification information in association with each other, the total audio play time indicating a total play duration of audio data transmitted from each of the other communication devices, wherein the determining operation further comprises:

determining the update frequency information to set a portion of the inter-frame coded image data as a non-target for transmission to be a first interval for the video data transmitted from one of the other communication devices identified by identification information associated with a first total audio play time; and determining the update frequency information to set a portion of the inter-frame coded image data as a non-target for transmission to be a second interval for the video data transmitted from one of the other communication devices identified by an identification information associated with a second total audio play time.

10. The non-transitory computer-readable medium according to claim 9, wherein the first total audio play time is greater than the second total audio play time, and wherein the first interval is less than the second interval.

11. The non-transitory computer-readable medium according to claim 1, wherein the timing corresponds to a predetermined I-frame interval greater than zero.

12. A non-transitory computer-readable medium storing computer readable instructions that, when executed by a processor of a server configured to conduct a remote conference via a network, perform a method comprising:

a first obtaining operation obtaining video data and identification information via a communication unit of the server connected to the network, the video data being based on an image captured in each of a plurality of communication devices including a first communication device and a second communication device, the video data including a plurality of inter-frame coded image data and a plurality of intra-frame coded image data, and the identification information identifying each of the plurality of communication devices, the plurality of communication devices participating in a remote conference with one another;

a second obtaining operation obtaining, from the first communication device via the communication unit, update frequency information of the first communication device, first identification information identifying the first communication device and second identification information identifying the second communication device, the update frequency information indicating a timing at which video data corresponding to a captured image of the second communication device positioned outside a video display region of a display of the first communication device is to be updated, the update frequency information of the first communication device setting at least a portion of the plurality of inter-frame coded image data included in the video data of the second communication device as a non-target for transmission the captured image being reproduced from the video data of the second communication device;

a storing operation storing the update frequency information of the first communication device, the first identification information and the second identification information in association with each other; and a judgment operation judging, in response to obtaining the video data of the second communication device and the second identification information, whether a specific coded image data included in the video data of the second communication device is a non-target for transmission set by the update frequency information of the first communication device associated with the first identification information and the second identification information.

13. The non-transitory computer-readable medium according to claim 12, wherein the method further comprises a transmission control operation comprising:

causing transmission of, in response to judging that specific coded image data is a target for transmission by the judgment operation, the video data of the second communication device including the specific coded image data and the second identification information obtained by the first obtaining operation; and in response to judging that specific coded image data is a non-target for transmission, not performing transmission of the video data of the second communication device including the specific coded image data and the second identification information obtained by the first obtaining operation.

14. The non-transitory computer-readable medium according to claim 12, wherein the storing operation further comprises updating the stored update frequency information of the first communication device associated with the first identification information and the second identification information based on a bandwidth of the video data of the second communication device.

15. The non-transitory computer-readable medium according to claim 12, wherein the storing operation further comprises:

updating the update frequency information of the first communication device to set a portion of the plurality of inter-frame coded image data as a non-target for transmission when data amount of the video data of the second communication device is equal to or greater than a predetermined threshold; and maintaining the update frequency information of the first communication device when data amount of the video data of the second communication device is less than the predetermined threshold.

16. The non-transitory computer-readable medium according to claim 15, wherein the updating comprises reducing an amount of inter-frame coded image data set as the non-target for data transmission.

17. A remote conference system configured to conduct a remote conference via a network comprising:

a first communication device;
a second communication device; and
a server,
wherein the first communication device comprises:
a first communication unit configured to connect to the network;
a first processor; and
a first memory storing computer readable instructions that, when executed by the first processor, perform a method comprising:
a first obtaining operation obtaining video data of the second communication device and second identification information identifying the second communication device via the first communication unit connected to the network, the video data of the second communication device being based on an image captured in the second communication device, the video data of the second communication device including a plurality of inter-frame coded image data and a plurality of intra-frame coded image data;
a display control operation displaying a first portion of a video layout region on a video display region of a display of the first communication device and not displaying a second portion of the video layout region outside the video display region, the first portion of the video layout region corresponding to the video display region, the captured image being laid out in the video layout region, and the captured image being reproduced from the video data of the second communication device;
a first judgment operation judging whether a specific captured image is included in the video display region based on a relationship between the video layout region and the video display region, the specific captured image being one of a plurality of captured images reproduced from the video data of the second communication device; and
a first determining operation determining update frequency information of the first communication device in response to the first judgment operation judging that the specific captured image is positioned outside the video display region, the update frequency information indicating a timing at which the video data of the second communication device corresponding to the specific captured image positioned outside the video display region is to be updated, the update frequency information setting at least a portion of the plurality of inter-frame coded image data included in the video data of the second communication device as a non-target for transmission,
wherein the server comprises:
a second communication unit configured to connect to the network;
a second processor; and a second memory storing computer readable instructions that, when executed by the second processor, perform a method comprising:
  a second obtaining operation obtaining the video data of the second communication device and the second identification information via the second communication unit connected to the network;
  a third obtaining operation obtaining the update frequency information of the first communication device, first identification information identifying the first communication device and the second identification information from the first communication device via the second communication unit;
  a storing operation storing the update frequency information of the first communication device, the first identification information and the second identification information in association with each other; and
  a second judgment operation judging, in response to obtaining the video data of the second communication device and the second identification information by the second obtaining operation, whether specific coded image data included in the video data of the second communication device is a non-target for transmission set by the update frequency information of the first communication device associated with the first identification information and the second identification information.

* * * * *